(12) United States Patent
Yamada et al.

(10) Patent No.: US 7,383,122 B2
(45) Date of Patent: Jun. 3, 2008

(54) NAVIGATION SYSTEM, USER TERMINAL, NAVIGATION DEVICE, AND INFORMATION RECORDING METHOD

(75) Inventors: Kunihiro Yamada, Okazaki (JP); Satoshi Ogawa, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 724 days.

(21) Appl. No.: 10/499,499

(22) PCT Filed: Jun. 23, 2003

(86) PCT No.: PCT/JP03/07911
§ 371 (c)(1),
(2), (4) Date: Jun. 21, 2004

(87) PCT Pub. No.: WO04/001336
PCT Pub. Date: Dec. 31, 2003

(65) Prior Publication Data
US 2005/0065713 A1    Mar. 24, 2005

(30) Foreign Application Priority Data
Jun. 21, 2002    (JP) .............................. 2002-182134

(51) Int. Cl.
*G01C 21/00*    (2006.01)
(52) U.S. Cl. .................... 701/200; 701/201; 701/208; 340/993; 342/357.09

(58) Field of Classification Search ................ 701/200, 701/201, 207, 208, 210; 340/990, 993, 995, 340/998, 995.1; 370/401, 480; 342/357.08, 342/357.09
See application file for complete search history.

(56) References Cited

U.S. PATENT DOCUMENTS 6,249,740 B1    6/2001    Ito et al.
6,314,369 B1    11/2001   Ito et al.

FOREIGN PATENT DOCUMENTS

| JP | A 6-243395 | 9/1994 |
| JP | A 2001-34889 | 2/2001 |

*Primary Examiner*—Gertrude A. Jeanglaude
(74) *Attorney, Agent, or Firm*—Oliff & Berridge, PLC

(57) ABSTRACT

A navigation system includes a controller that compresses at least one of a plurality of information portions, each one of the plurality of information portions having a priority, wherein each of the at least one of the plurality of information portions is compressed based on its priority; and a transmitter that transmits the at least one compressed information portion to a navigation device. A navigation device includes a receiver that receives at least one of a plurality of information portions, each one of the plurality of information portions having a priority, wherein each of the at least one of the plurality of information portions is compressed based on its priority.

33 Claims, 21 Drawing Sheets

NAVIGATION SYSTEM, USER TERMINAL, NAVIGATION DEVICE, AND INFORMATION RECORDING METHOD

INCORPORATION BY REFERENCE

This application is a national stage of International Patent Application PCT/JP2003/007911, filed Jun. 23, 2003, which claims priority of Japanese Patent Application No. 2002-182134 filed Jun. 21, 2002. The disclosures of which, including the specification, drawings, and claims are incorporated herein by reference in their entirety.

BACKGROUND OF THE INVENTION

1. Field of the Invention

The present invention relates to a navigation system, user terminal, navigation device, and information recording method.

2. Description of Related Art

In a conventional navigation device, a current position of a vehicle is detected by means of GPS (global positioning system). At the same time, a vehicle direction is detected based on the vehicle's angular velocity detected by a gyro sensor. A map screen is formed on a display of a display section. A current position, a surrounding map, and the vehicle direction are indicated on the map screen. Therefore, an operator, can drive a vehicle following the current position, surrounding map and the vehicle direction indicated on the map screen.

If the driver sets a target destination and a search condition, a route from the current position up to the target destination is searched for based on the search condition. Then, the searched route is displayed on a search route display screen formed on the display or audibly output by an audio output section communicate. Therefore, the driver can drive a vehicle along the searched route.

The navigation device includes a communication section, and is capable of receiving traffic information, for example, congestion information through the communication section and displaying the received congestion information on the map screen.

A navigation system has been proposed in which the user transmits route guidance data to the navigation device before the user operates the vehicle. When the user operates the vehicle and starts driving, the route guidance can start following the transmission of the route guidance data (see Japanese Patent Application Laid-Open No. HEI 6-243395). In this case, the route guidance data is obtained by operating a personal computer at a home or in an office to input, for example, a target destination and/or search condition and route guidance data is transmitted to the navigation device while the vehicle is parked.

However, according to this conventional navigation device, if a time necessary for transmitting the route guidance data to the navigation device (hereinafter referred to as "required communication time") is long, the navigation device needs to be turned on during that period. Therefore, electric power consumed by the navigation device is increased and a load applied to a battery mounted on the vehicle is increased tremendously.

SUMMARY OF THE INVENTION

Accordingly, various exemplary embodiments of this invention provide a navigation system, including a controller that compresses at least one of a plurality of information portions, each one of the plurality of information portions having a priority, wherein each of the at least one of the plurality of information portions is compressed based on its priority; and a transmitter that transmits the at least one compressed information portion to a navigation device.

Various exemplary embodiments of the invention provide a navigation device, including a receiver that receives at least one of a plurality of information portions, each one of the plurality of information portions having a priority, wherein each of the at least one of the plurality of information portions is compressed based on its priority.

Various exemplary embodiments of the invention provide a method for transmitting information to a navigation device, including compressing at least one of a plurality of information portions, each one of the plurality of information portions having a priority, wherein each of the at least one of the plurality of information portions is compressed based on its priority; and transmitting the at least one compressed information portion to a navigation device.

Various exemplary embodiments of the invention provide a method for receiving information in a navigation device, including receiving at least one of a plurality of information portions, each one of the plurality of information portions having a priority, wherein each of the at least one of the plurality of information portions is compressed based on its priority.

BRIEF DESCRIPTION OF THE DRAWINGS

Exemplary embodiments of the invention will now be described with reference to the accompanying drawings, wherein.

DETAILED DESCRIPTION OF EXEMPLARY EMBODIMENTS

Figure 1:
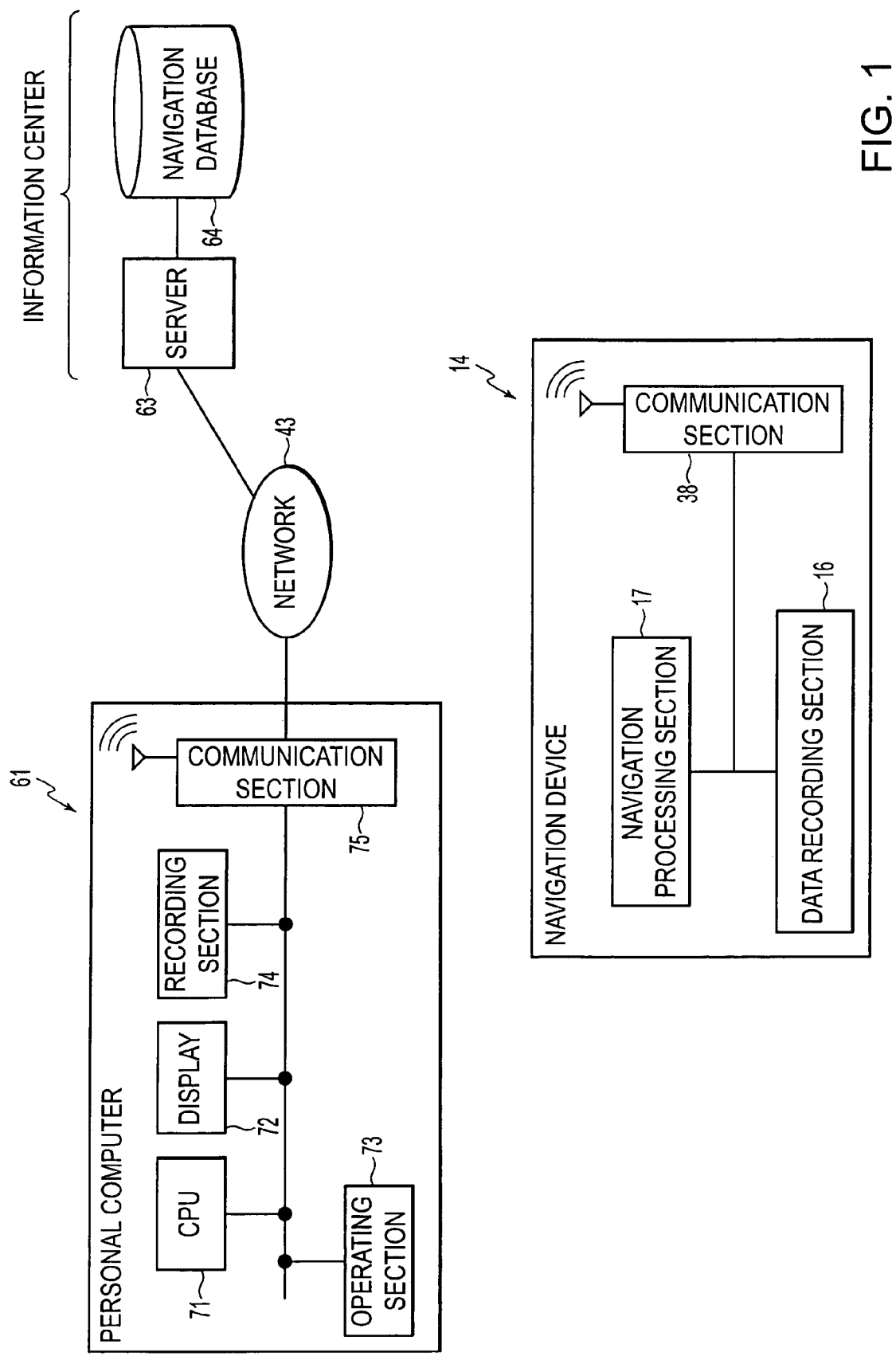
FIG. 1 is a block diagram of a navigation system according to a first exemplary embodiment of the invention.

FIG. 1 is a block diagram of a navigation system according to a first exemplary embodiment of the invention. As shown in FIG. 1, the navigation system includes a personal computer 61 as a user terminal and an information center 62 as an information provider. The personal computer 61, the information center 62 and the like are connected via a network 43. The information center 62 provides navigation data.

The navigation system includes a navigation device 14 which may be a vehicle on-board device mounted on a vehicle. The navigation device 14 may include a navigation processing section 17, a data recording section 16 as an information recording section, a communication section 38.

The personal computer 61 may include a CPU 71 as an arithmetic operation unit and control unit, a display section 72 for notifying an operator of variety of information, an operating section 73, a recording section 74, a communication section 75. The communication section 75 may contain, for example, a modem (not shown) for connecting the personal computer 61 to the information center 62, and/or an access point (not shown) for connecting the personal computer 61 to the navigation device 14 via the communication section 38 by means of radio.

Although according to this embodiment, the CPU 71 is used as the arithmetic operation unit and control unit, an MPU or the like may be used instead of the CPU 71. The display section 72 may include, for example, a CRT display, a liquid crystal display, and/or a plasma display. Although according to this exemplary embodiment, the display section 72 visually communicates with a user, an audio unit which notifies the operator of variety of information audibly may be used instead of the display section 72.

The operation section 73 may include, for example, a keyboard, a mouse, and the like. Alternatively, a touch panel formed on the above mentioned display may be used. Operational regions such as various kinds of keys, switches, buttons and the like may be formed on the display on the touch panel. Further, the operation section may include a bar code reader, a remote control unit for remote control operation, a joy stick, a light-pen, a stylus pen, or the like.

The recording section 74 may include such internal storage units as a RAM, a ROM, a flash memory, and/or a hard disk. The recording section 74 may also include a flexible disc, a magnetic tape, a magnetic drum, a CD-ROM, a CD-R, a MD, a DVD, an optical disc, a MO, a IC card, an optical card, a memory card, or the like.

Although, according to this exemplary embodiment, the personal computer 61 is used as the user terminal, any other device which can be connected to the network 43 and execute bi-directional communication, such as an electronic notebook, a portable phone, a portable terminal, a PDA (personal portable information terminal), a TV phone, a game machine, or the like may be used instead of the personal computer 61.

The information center 62 can include a server 63, a navigation database (DB) 64 which is connected to the server 63 and stores navigation data, and the like. The navigation database 64 may include map data for displaying a map, a search data for searching for a route, a facility data on various kinds of facilities, and the like. Data such as road data, intersection data, node data may be included in the map data.

The road data may include data representing road width, gradient, cant, bank, road condition, number of lanes, a location in which the number of lanes decreases, a location in which the road width decreases, railroad crossings, and the like. Specifically, with respect to corners, the road data may include data representing curvature radius, intersection, T-shaped crossing, corner entrance/exit, and the like. The road data may further include data representing a descending road, an ascending road, and the like. With respect to the road type, the road data may include data representing general roads, national roads, prefectural roads, narrow streets, highway/toll express roads, urban express roads, and/or toll roads. The road data may include data representing a road attached to an entrance/exit (ramp way), and/or data recording toll booths and the like.

The node data may include data representing a branch point (including intersection, T-shaped crossing and the like) of an actual road, coordinates (position) of a node point set at every predetermined distance corresponding to the curvature radius or the like of each road, links between the nodes which connect respective node points, the height of each node point (altitude), and the like.

The facility data may include, data representing hotels, gas stations, parking lots, and/or sightseeing facilities. In the navigation database 64, audio output data for outputting predetermined information through an audio output section (not shown) of the navigation unit 14 may be recorded.

The information center 62 is capable of receiving, for example, traffic information including congestion information, restriction information, parking lot information, traffic accident information, crowded service area information, and the like, which may be transmitted from traffic information transmission center as a traffic information provider in information providers, for example, VICS® (Vehicle Information and Communication System) (not shown) center. The information center 62 is also capable of receiving general information such as news and/or weather. The information center 62 is capable of sending the traffic information and general information to the personal computer 61 through the network 43 and recording the traffic information and general information in the navigation database 64. For that purpose, a statistical data file (not shown) is formed in the navigation database 64, wherein old traffic information and general information are recorded in time series and the old traffic information and general information are subjected to a specific processing as original data to record the processed traffic information and general information. Note that, when the traffic information and general information are processed, the general information is referred to if necessary.

The information center 62 may be capable of sending, not only the traffic information and general information but also video information of TV program, music information, music, and the like to the personal computer 61 through the network 43.

The information center 62 may be maintained by an individual, a corporation, an organization, a local government, a national governmental agency, or the like. The information center 62 may create the navigation data for itself or purchase the data from other information creators for distribution.

The network 43 may include a LAN (Local Area Network), a WAN (Wide Area Network), an intranet, a portable phone system network, a telephone line network, a public communication line network, a private communication network, the internet and/or the like. Further, the network 43 may utilize CS broadcasting and BS broadcasting based on a broadcasting satellite, ground wave digital TV broadcasting, FM multiplexed broadcasting, and/or the like. The network 43 may also use communication means such as non-stop electronic toll collection system (ETC) used in intelligent transport system (ITS), dedicated short-range communication (DSRC), and/or the like. Note that the personal computer 61, the server 63, the provider's server, and/or the navigation processing section 17 may function independently or may be combined as a multi-function computer.

Figure 2:
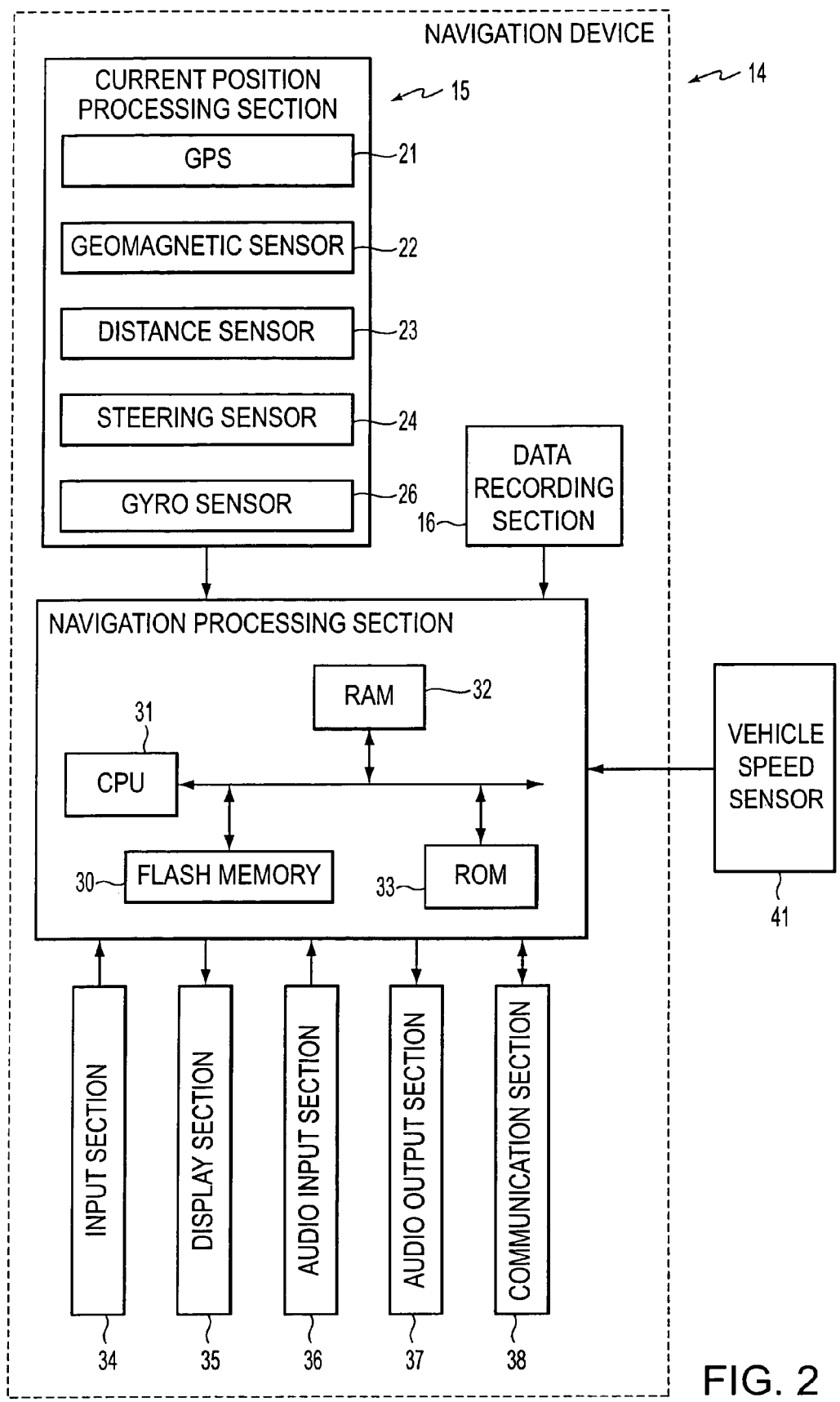
FIG. 2 is a diagram for explaining a navigation device according to the first exemplary embodiment of the invention.

Next, an example of a navigation device 14 having the above-described structure will be described with reference to FIG. 2. FIG. 2 is a diagram for explaining the navigation device according to the first exemplary embodiment of the invention. As shown in FIG. 2, the navigation device 14 can include a current position detection processing section 15 for detecting a current position, the data recording section 16 in which various kinds of data may be recorded, the navigation processing section 17 for executing various kinds of arithmetic operation processing based on inputted information, an input section 34 as a first operating section, a display section 35 as a first notifying section, a voice input section 36 as a second operating section, a voice output section 37 as a second notifying section, and the communication section 38. A vehicle speed sensor 41 is connected to the navigation processing section 17.

The current position detection processing section 15 can include a GPS 21, a geomagnetic sensor 22, a distance sensor 23, a steering sensor 24, a gyro sensor 26, an altimeter (not shown), and/or the like.

The GPS 21 detects a current position on the earth by receiving an electronic wave generated by an artificial satellite, the geomagnetic sensor 22 detects the direction of an the user vehicle by measuring geomagnetism, and the distance sensor 23 detects a distance between predetermined positions on the road. Regarding the distance sensor 23, it is permissible to use a type which measures a revolution velocity of wheels (not shown) and detects a distance based on the revolution velocity, a type which measures an acceleration and detects a distance by integrating the acceleration twice, and/or the like.

The steering sensor 24 detects a steering angle, and may include, for example, an optical revolution sensor attached to a revolution section of a steering wheel (not shown), a revolution resistance sensor, an angle sensor attached to wheels and/or the like.

The gyro sensor 26 detects a turning angle and may include, for example, a gas rate gyro, a vibration gyro and/or the like. By integrating the turning angles detected by the gyro sensor 26, the direction of the user vehicle can be detected.

Note that the GPS 21 is capable of detecting a current position by itself. However, the current position can also be detected by combining a distance detected by the distance sensor 23 with the direction detected by the geomagnetic sensor 22, a turning angle detected by the gyro sensor 26, or a steering angle detected by the steering sensor 24.

The navigation processing section 17 can include internal storage units such as a CPU 31 which works as an arithmetic operation unit and control unit for controlling the navigation device 14, a RAM 32, which is used as a working memory when the CPU 31 executes various kinds of arithmetic operations, a ROM 33 which stores various kinds of programs for route searching, route guidance, determination of specific intervals, and/or for control. The navigation processing section 17 can include a flash memory 30 for recording navigation data transmitted from the personal computer 61. The input section 34, the display section 35, the audio input section 36, the audio output section 37 and the communication section 38 also may be connected to the navigation processing section 17. Note that a semiconductor memory, a magnetic core, and/or the like may be used for the RAM 32, the ROM 33, and/or the flash memory 30. Then, it is permissible to use the MPU and the like instead of the CPU 31 as the arithmetic operation unit and control unit.

The data recording section 16 can include a hard disk (not shown) as a recording medium, and can include a recording head (not shown) as a driver to read out a predetermined program, data, and the like recorded in the hard disk and write predetermined data into the hard disk.

Although, according to this embodiment, the hard disk may be used as an external storage unit, a magnetic disk, such as a flexible disk, can be used as an external storage unit instead of the hard disk. Further, a memory card, a magnetic tape, a magnetic drum, a CD, a MD, a DVD, an optical disk, a MO, an IC card, an optical card, and/or the like may be used as an external storage unit.

Although, according to this exemplary embodiment, the ROM 33 may store various kinds of programs and the data recording section 16 records various kinds of data, programs, data and/or the like can be recorded in the same external storage unit. In this case, for example, the programs, data and/or the like can be read out from the external storage unit and written into the flash memory 30. Therefore, the programs, data, and/or the like can be updated by replacing the external storage unit. If an automatic transmission control unit for controlling an automatic transmission (not shown) loaded on a vehicle is installed, programs, data, and/or the like for controlling the automatic transmission control unit can be also recorded in the external storage unit.

The input section 34 may be used for correcting a current position when a vehicle starts, inputting a departure point as a guidance starting point and a target destination as a guidance end point, and/or operating the communication section 38. The input section may include control switches (not shown) such as various kinds of keys, switches, buttons and the like. Further, the input section 34 may include a keyboard, a mouse, a bar code reader, a remote control unit for remote control operation, a joy stick, a light-pen, a stylus pen and/or the like. The input section 34 may be formed by operation switches such as various kinds of keys, switches, buttons and the like shown as images on a touch screen forming part of the display section 35. In this case, the input is carried out by touching the operation switches.

Various information including, for example, operation guidance, operation menus, key guidance, search results, guidance information along the search route, media programming, and the like may be shown on various kinds of screens formed on the display. The display section 35 can include displays such as, for example, a CRT display, a liquid crystal display, a plasma display and/or a hologram unit for projecting a hologram on a vehicle windshield.

The audio input section 36 may include a microphone or the like (not shown) and is capable of inputting necessary information with sound. The audio output section 37 can include a voice synthesizer and a speaker (not shown). The search route, guidance information, and/or the like may then be outputted with voice synthesized by the voice synthesizer from the audio output section 37. Note that, it is possible to output not only voice synthesized by the voice synthesizer, but also various other kinds of sounds and variety of guidance information recorded in advance in a tape, memory or the like.

The communication section 38 can include a beacon receiver that receives traffic information including congestion information, restriction information, parking lot information, traffic accident information, and/or service area information, transmitted from a traffic information transmission center, for example, the VICS® center, in the form of electric wave beacon signals, light beacon signals or the like via electric wave beacon units, light beacon units, or the like disposed along a road. The communication section 38 can also include an FM receiver for receiving FM multiplexed information constituted of general information such as news, weather forecast in the form of FM multiplexed broadcasting via an FM broadcasting station.

The communication section 38 is capable of receiving various kinds of data such as D-GPS information for detecting a detection error in the GPS 21. The communication section 38 is also capable of receiving position information based on the electric wave beacon signals, light beacon signals, and the like to detect the current position, and thus may function as a current position detecting section.

The navigation device 14 and the personal computer 61 (FIG. 1) may be connected to each other by wireless LAN which enables bi-directional communication. Accordingly, the communication section 75 may be provided with access points as described above while slots (not shown), such as PCMCIA slot, PC card slot may be formed in the communication section 38, so that a radio card (not shown) can be inserted into the slot. Although according to this exemplary embodiment, the navigation device 14 and the personal computer 61 may be connected to each other by the wireless LAN, according to various other exemplary embodiments, the navigation device 14 and the personal computer 61 may be connected by wired LAN. According to those exemplary embodiments, the communication section 75 can be provided with hubs, so that the hubs and the communication section 38 are detachably coupled by a cable.

Figure 3:
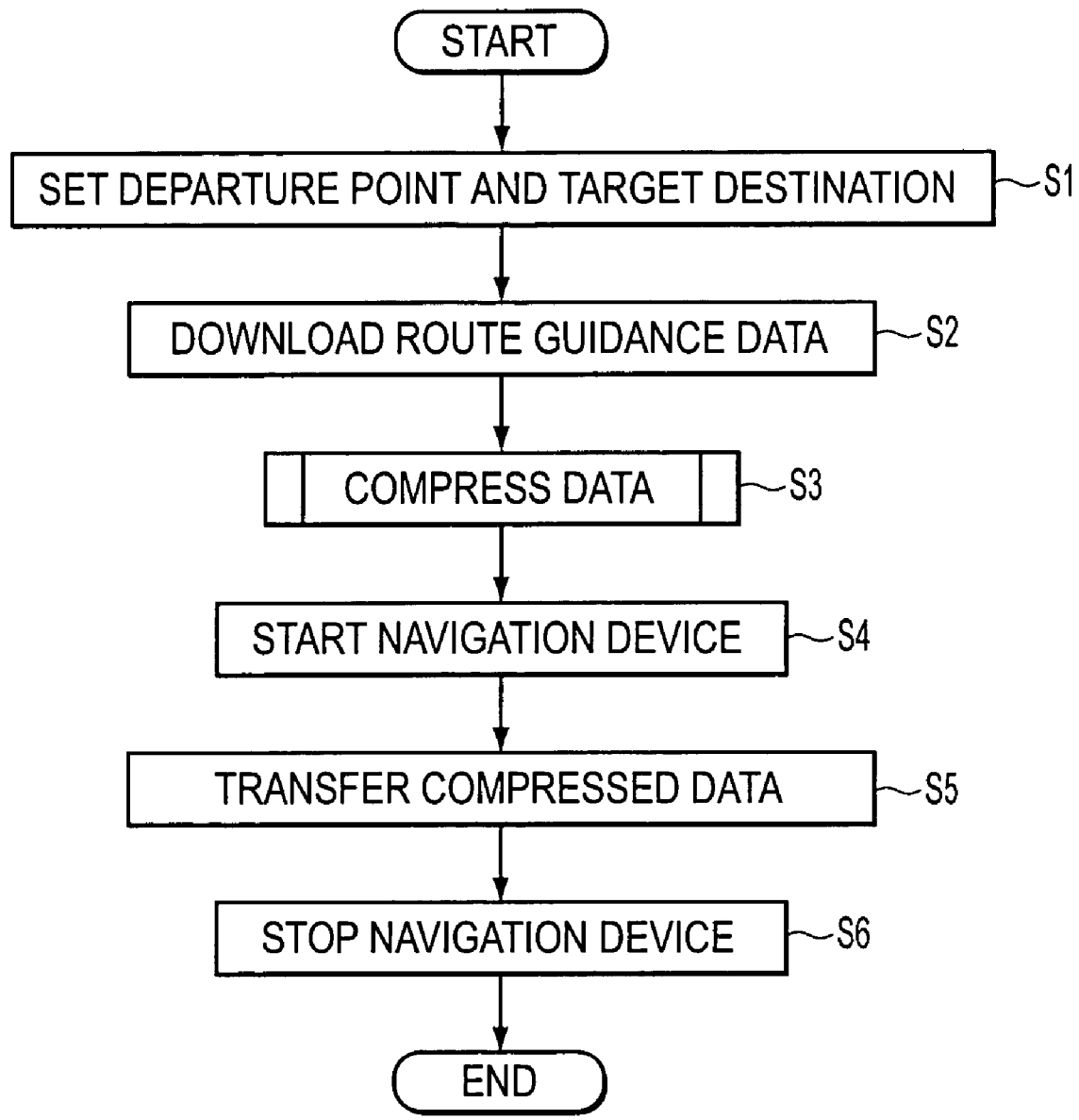
FIG. 3 is a flow chart indicating the operation of a personal computer according to the first exemplary embodiment of the invention.
Figure 4:
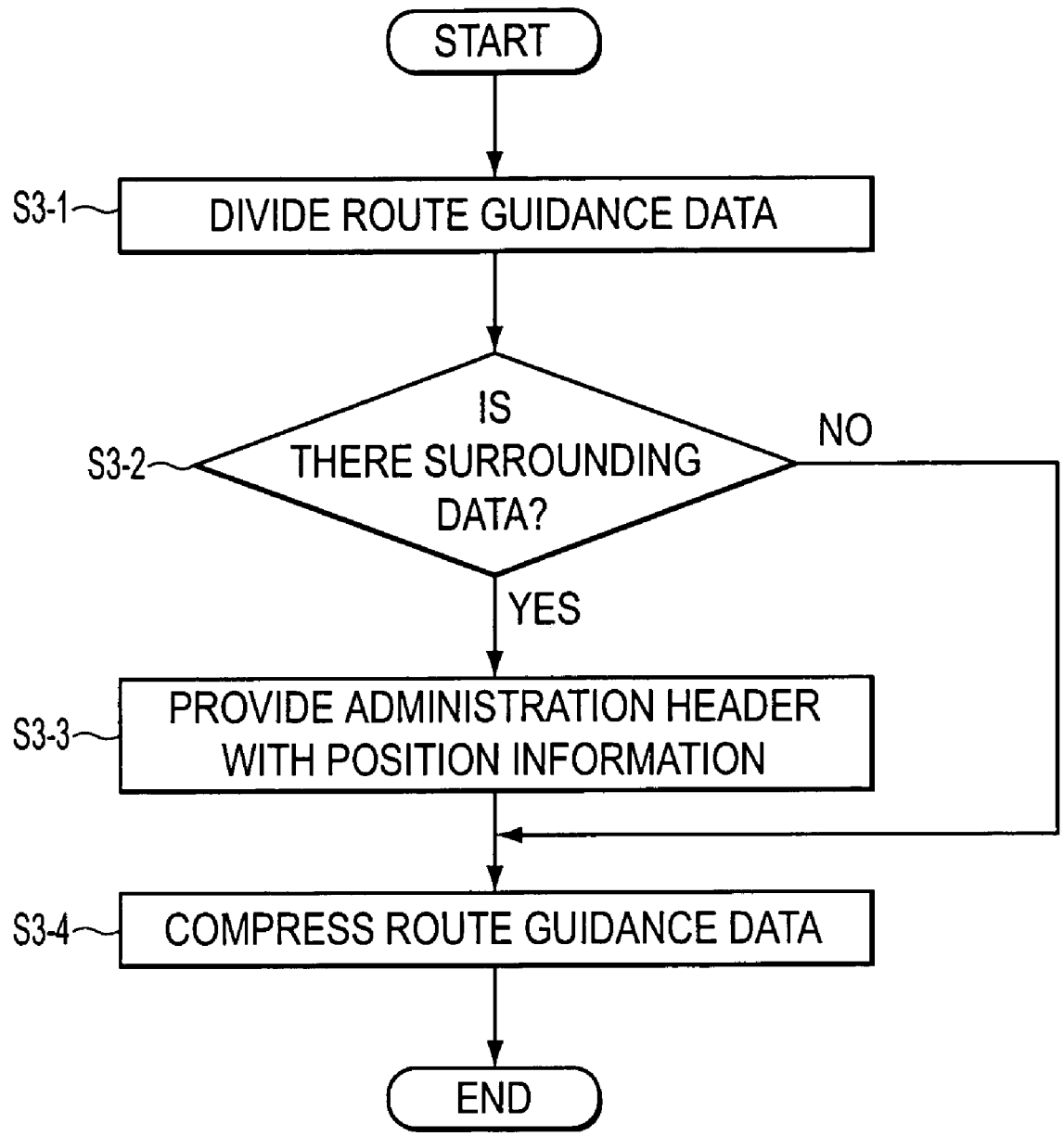
FIG. 4 is a diagram showing the sub-routine of compression processing according to the first exemplary embodiment of the invention.
Figure 5:
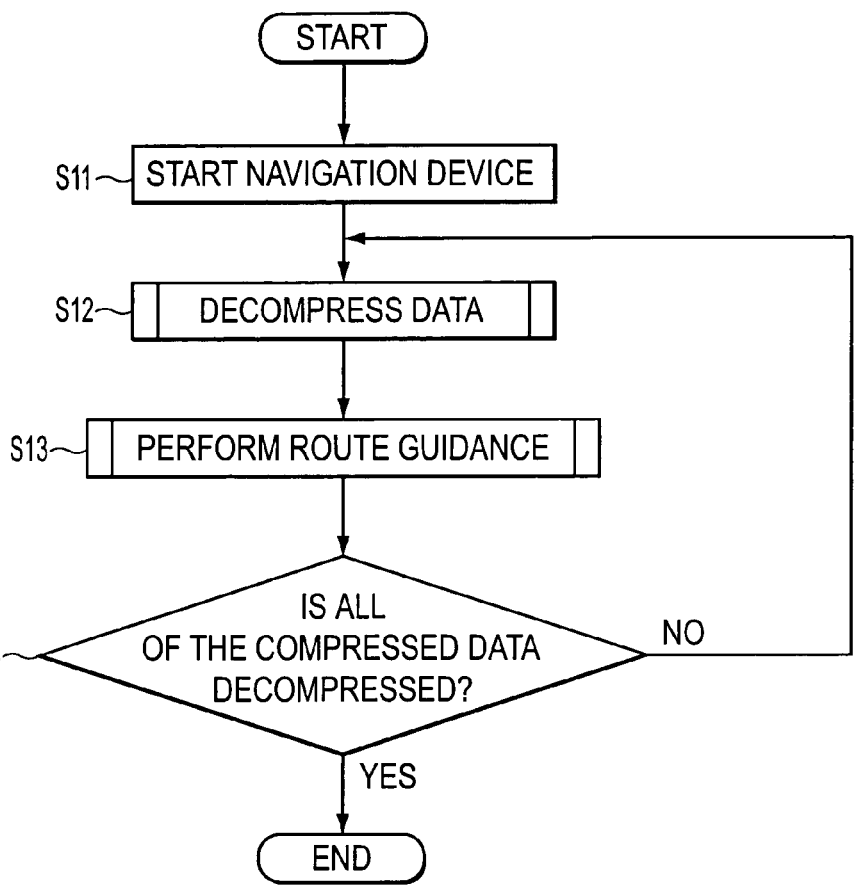
FIG. 5 is a flow chart showing the operation of the navigation device according to the first exemplary embodiment of the invention.
Figure 6:
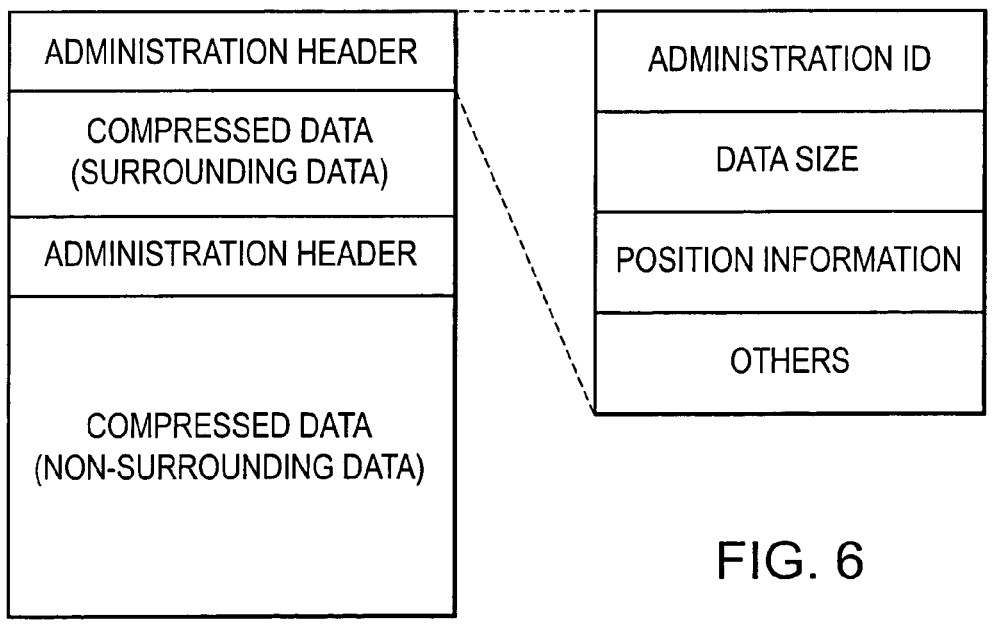
FIG. 6 is a diagram showing the data configuration of compressed data according to the first exemplary embodiment of the invention.
Figure 7:
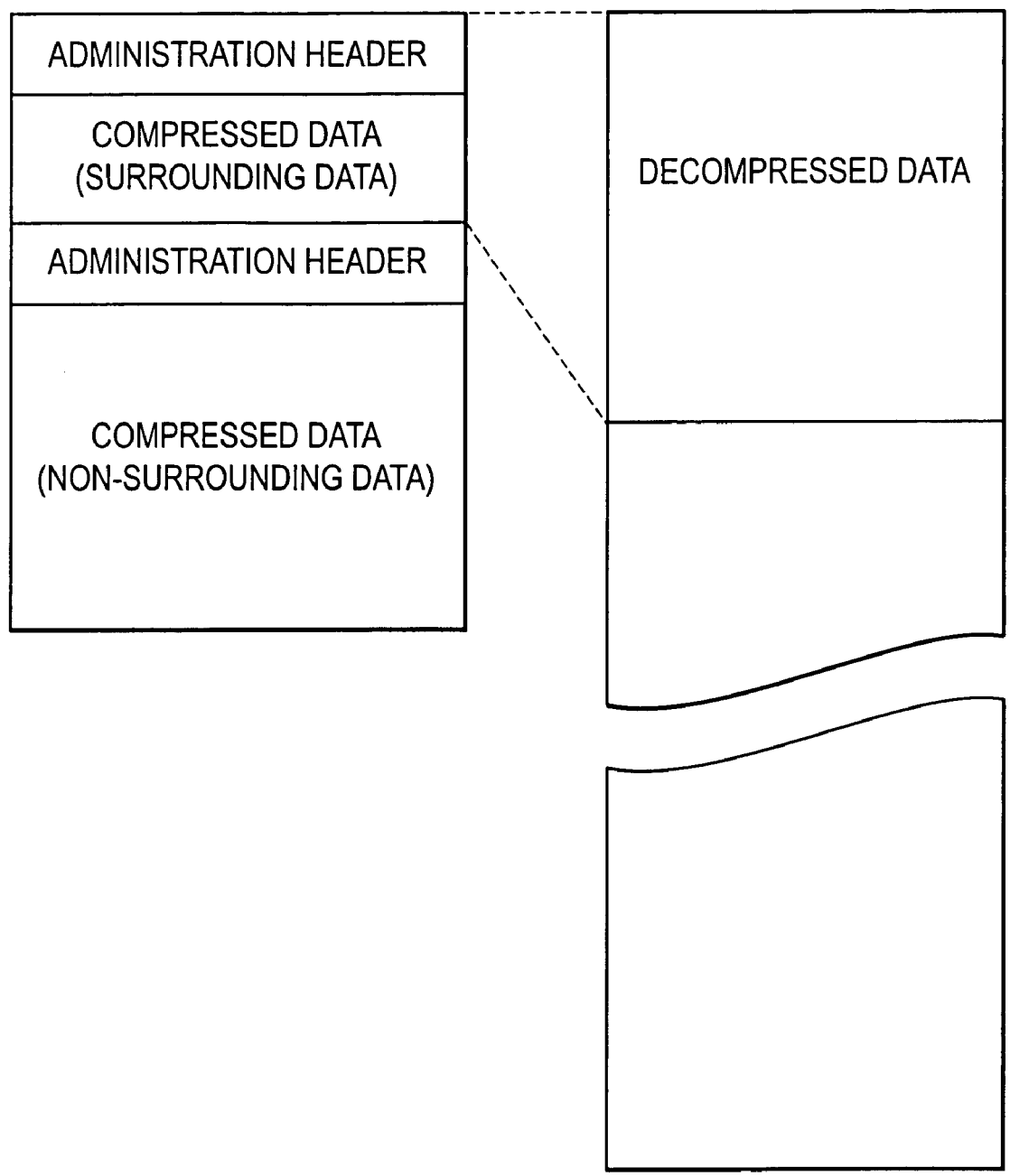
FIG. 7 is a diagram showing data configuration upon decompression processing according to the first exemplary embodiment of the invention.

Next, the operation of a navigation system having the above-described structure will be described with reference to FIGS. 3-7. FIG. 3 is a main flow chart indicating the operation of a personal computer according to the first exemplary embodiment of the invention. FIG. 4 is a diagram showing the sub-routine of compression processing according to the first exemplary embodiment of the invention. FIG. 5 is a flow chart showing the operation of the navigation device according to the first exemplary embodiment of the invention. FIG. 6 is a diagram showing the data structure of the compressed data according to the first exemplary embodiment of the invention. FIG. 7 is a diagram showing the data structure upon decompression processing according to the first exemplary embodiment of the invention.

As shown in FIG. 3, if an operator inputs a departure point and a target destination by operating the operation section 73 of the personal computer 61 (FIG. 1), the CPU 71 executes search condition setting processing, in which the departure point and target destination are set as the search conditions, and the search conditions are transmitted to the information center 62 (step S1).

If as the user terminal, for example, a PDA or the like is used instead of the personal computer 61, a GPS card can be set in, for example, a PCMCIA slot in the PDA, a PC card slot, and a current position detected by the GPS card can be set as the departure point.

If the search conditions are received by the server 63 in the information center 62, the server 63 executes information obtainment processing, reads out the search data in the navigation database 64, reads out statistical data and reads traffic information transmitted by the VICS (registered trade mark) so as to obtain information necessary for searching a route.

Subsequently, the server 63 executes search processing, in which a route is searched based on search data, traffic information, statistical data and the like according to the search conditions.

If a route is searched for by the server 63, the server 63 transmits route data indicating, for example, a search route, map data indicating a map of a surrounding area of the search route, audio output data for guiding along the search route through the audio output section 37 (FIG. 2), and the like to the personal computer 61 as the route guidance data.

The route data may contain road data (road attribute and the like) which constitutes the search route, and the map data may contain area information such as areas containing the search route and areas adjacent to the areas containing the search route.

Each area consists of map data of a square region of predetermined size. Each area may be set such that, for example, the quantity of the map data, is within a specified range, and each area is supplied with a parcel number as an identification number. The surface area of each area differs between an area having a large amount of information contained in the map data like urban area and an area having a small amount of map data like suburban area. For example, if an area is composed of 128 K byte of data that area may correspond to a 4-Km square region on the map. Comparatively, an area having a larger amount of information contained in the map data may correspond to a 2-Km square region on the map, and an area having a smaller amount of information contained in the map data may correspond to an 8-Km square region.

Although according to this exemplary embodiment, the server 63 searches for a route based on search data, traffic information, statistical data and the like, according to various other exemplary embodiments, the server 63 may search for a route based on only the search data. In this case, the server transmits route data indicating a search route to the personal computer 61 as route guidance data.

Although according to this exemplary embodiment, the audio output data may be transmitted from the information center 62 to the personal computer 61, according to various other exemplary embodiments, the audio output data may be recorded in the data recording section 16 of the navigation device 14 in advance. In this case, the voice output data does not need to be transmitted as part of the route guidance data.

In the personal computer 61, if the route guidance data is transmitted, the CPU 71 carries out reception processing to receive the route guidance data, and subsequently, the CPU 71 executes recording processing to download the route guidance data into a hard disk in the recording unit 74 for recording (step S2).

When a vehicle is parked in a garage, for example, the operator can transfer the route guidance data, which is downloaded into the hard disk, to the navigation device 14 by operating the operation section 73 and record it in the flash memory 30, for example, in the navigation processing section 17.

If the communication time required for transmitting the route guidance data to the navigation device 14 is long, the power supply (not shown) in the navigation device 14 needs to be providing power during this time. Therefore, the amount of electric power consumed by the navigation device 14 increases and a load applied to a battery (not shown) mounted on the vehicle increases tremendously.

If the required communication time is long, the operator needs to monitor the personal computer 61 during this time. Thus, not only monitoring the personal computer 61 is troublesome, but also a cost for the lengthy transmission is increased.

Thus, according to this exemplary embodiment, the CPU 71 may execute compression processing to compress the route guidance data downloaded into the hard disk to produce compressed data, and the compressed data is transferred to the navigation device 14 (step S3).

In this case, the navigation device 14 needs to decompress the compressed data in order to access the route guidance data. Because the route guidance data cannot be used until all the compressed data is decompressed, the vehicle cannot be started immediately along a search route.

The CPU 71 reads out the route guidance data from the hard disk and after the navigation device 14 starts up, the route guidance data is divided into, for example, surrounding data and other non-surrounding data depending on whether a user needs it immediately (surrounding data) or not (non-surrounding data), (step S3-1). Note that the surrounding data refers to the route guidance data in an area or areas near a departure point (a current position in case where the search route is from the current position to a target destination). The non-surrounding data refers to the route guidance data in areas that do not contain the departure point. It is also possible to include the route guidance data of one or more areas adjacent to the area containing the departure point in the surrounding data, if necessary.

Then the compression processing means compresses the route guidance data on the surrounding data and non-surrounding data (step S3-4) to create compressed data supplied with an administration header (step S3-3), and the compressed data is recorded in the flash memory of the recording unit 74. Note that the administration header is information for controlling the compressed data and as shown in FIG. 6, constituted of an administration ID identifying the compressed data, data size indicating the size of the compressed data, other data, and the like.

Thus, the compression processing means determines whether a divided route guidance data is surrounding data (step S3-2). If the divided route guidance data is the surrounding data, the administration header is supplied with information regarding the surrounding data accompanied by the compression (step S3-3) and according to this exemplary embodiment, such information can include information about the position including a starting point of the route guidance data. Although, according to this exemplary embodiment, the position information can be in the form of, for example, coordinates, it may also be represented by road number, node number, or the like.

If the compressed data is recorded, the CPU 71 executes compressed data transmission processing to transfer the compressed data to the navigation device 14. Thus, if the operator operates the operation section 73 to give instruction for activating the navigation device 14, CPU 71 executes navigation device start processing to turn on the power of the navigation device 14 to start the navigation device 14 (step S4). Subsequently, the CPU 71 executes data transfer processing to read out compressed data from the flash memory of the recording unit 74 and transfer to the navigation device 14 (step S5). In the navigation device 14, the CPU 31 executes compressed data recording processing to record the compressed data into the flash memory 30.

If all the compressed data is recorded in the flash memory 30, the CPU 71 executes navigation device stop processing to stop the navigation device 14 (step S6), so that the compressed data is stored in the navigation device 14 and available.

As described above, when the route guidance data is transferred from the personal computer 61 to the navigation device 14, the route guidance data is compressed. Thus, the data size of that compressed data can be reduced. Therefore, required communication time is shortened and the time in which the navigation device 14 is powered on can be reduced. Thus, power consumed by the navigation device 14 is decreased, and the load applied to a battery mounted on a vehicle can be reduced.

Further, because the communication required time is short, the operator does not need to monitor the personal computer 61 for as long, thereby workload is reduced as well.

Next, the operation of the navigation device 14 when a vehicle is driven will be described with reference to FIG. 5. First, when the ignition switch of a vehicle is turned on, the navigation device 14 starts (step S11). Then, a current position is detected by the GPS 21 and the direction of the vehicle is detected based on, for example, a turning angle of the vehicle detected by the gyro sensor 26.

Next, the CPU 31 executes decompression processing to decompress the compressed surrounding data giving priority based on the current position (step S12). Thus, the CPU 31 reads the current position and reads out compressed data from the flash memory 30 to read the position information within the administration header of the compressed data. Subsequently, the CPU 31 determines whether the compressed data is surrounding data by comparing a current position of the vehicle with the position information in the administration header. If the compressed data is surrounding data, the CPU 31 decompresses the compressed data for the surrounding data as shown in FIG. 7 to create decompressed data and then, records the decompressing route guidance data into a hard disk in the data recording section 16. Note that the decompressed route guidance data may be recorded in the flash memory 30 instead of the hard disk.

If the CPU 31 fails in the decompression processing, it can execute the decompression processing again by re-reading out the compressed data from the flash memory 30.

The CPU 31 executes route guidance processing to read out route guidance data from the hard disk in the data recording section 16, forms a map screen on a display of the display section 35 based on the route guidance data, indicates a current position, surrounding map and direction of the vehicle on the map screen, displays a search route in a surrounding area of the current position, and/or notifies a driver of the search route through a message from the voice output section with audio in order to execute route guidance (step S13). Accordingly, a driver can drive a vehicle following the current position, surrounding map, direction of the vehicle and search route displayed on the map screen.

If decompression of compressed data for the surrounding data is completed and the route guidance data is recorded in the hard disk in this way, the CPU 31 then reads out the remaining non-surrounding compressed data from the flash memory 30, decompresses the remaining compressed data on the non-surrounding areas and records the decompressed route guidance data into the hard disk in the data recording section 16. Note that, it may alternatively be recorded in another region of the flash memory 30 instead of the hard disk.

Regarding the surrounding data, the decompression processing is carried out immediately after the ignition switch is turned on and the navigation device 14 starts. Thus, the vehicle can be driven immediately using the route guidance data for the area surrounding the vehicle.

Although according to this exemplary embodiment, the decompression processing is carried out after the ignition switch is turned on, according to various other exemplary embodiments, the decompression processing may be carried out at a predetermined timing after the ignition switch is turned on, for example, after the vehicle has started moving.

According to various other exemplary embodiments, after the CPU 31 records compressed data into the flash memory 30, the route following may be carried out before the CPU 71 stops the navigation device 14, in order to decompress the compressed data and record the route guidance data. First, if a current position is detected by the GPS 21, the CPU 31 reads the current position and reads out compressed data from the flash memory 30. The CPU 31 then reads position information in the administration header of the compressed data. The CPU 31 determines whether the compressed data is surrounding data by comparing the current position of the vehicle with the position information in the administration header. If the compressed data is surrounding data, the compressed data of the surrounding data is decompressed. The thus decompressed route guidance data is recorded in the hard disk of the data recording section 16. Note that it also can be recorded in the flash memory 30 instead of the hard disk.

After the ignition switch is turned on, the CPU 31 reads out the remaining non-surrounding compressed data form the flash memory 30, decompresses the compressed data of the non-surrounding data, and then, records the non-surrounding route guidance data into the hard disk of the data recording section 16. Note that it also can be recorded in the flash memory 30 instead of the hard disk.

Figure 8:
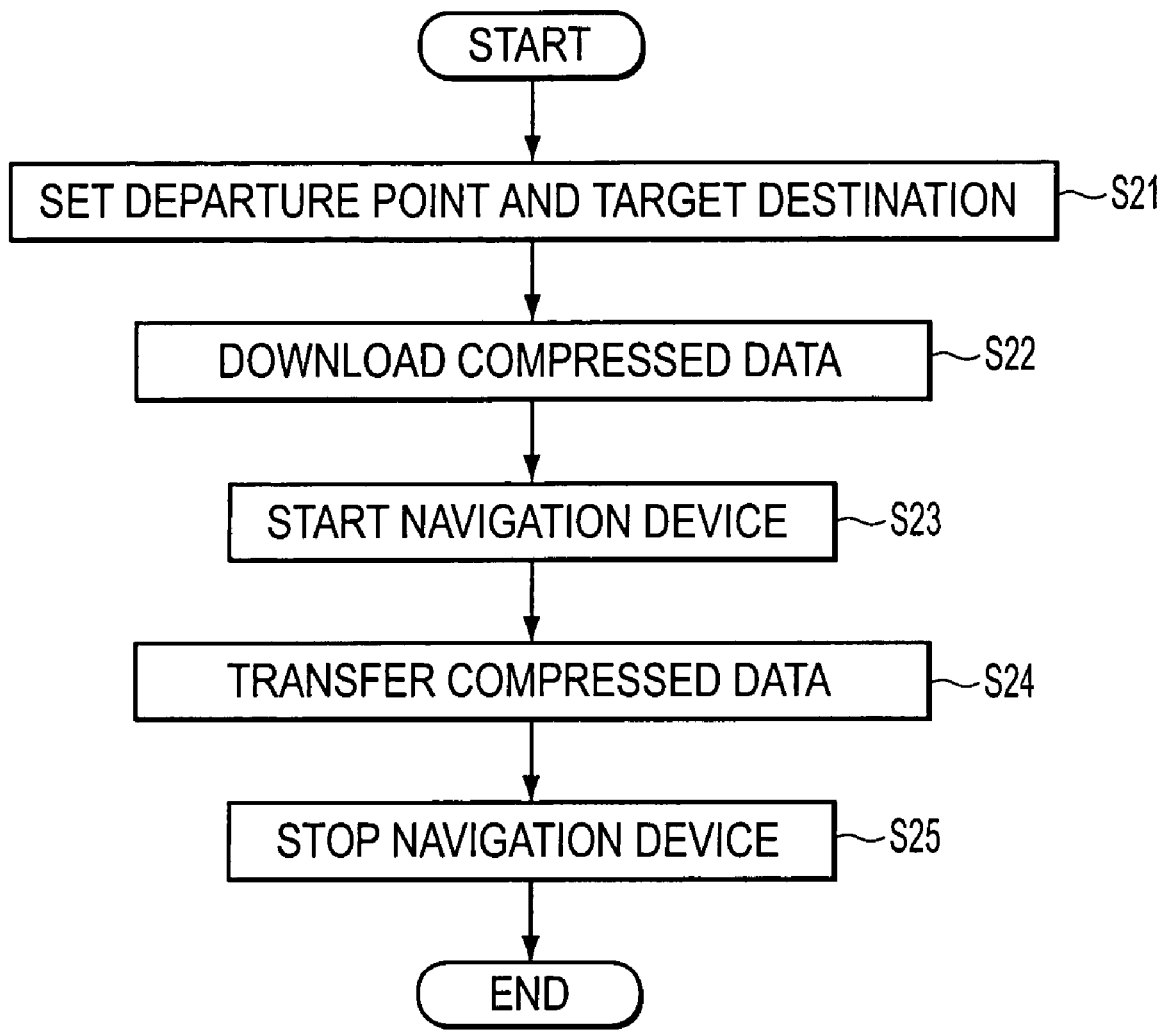
FIG. 8 is a flow chart showing the operation of a personal computer according to a second exemplary embodiment of the invention.

Next, a second exemplary embodiment of the invention in which compression processing is executed by the information center 62 will be described with reference to FIG. 8. FIG. 8 is a main flow chart showing the operation of a personal computer according to the second exemplary embodiment of the invention.

First, if the operator inputs a departure point and a target destination by operating the operating section 73 of the personal computer 61 (FIG. 1) as a user terminal, the CPU 71 executes search condition set processing, in which the departure point and the target destination are set as a search conditions (step S21) and then, the search conditions are transmitted to the information center 62 which is an information provider.

When the search conditions are received by the server 63, the server 63 executes information obtainment processing to obtain information necessary for searching for a route by reading the search data in the navigation database 64, reading statistical data and reading traffic information transmitted from the VICS (registered trade mark) center. Then, the server 63 executes search processing to search for a route based on search data, traffic information, statistical data and the like according to the search condition.

If a route is searched for by the server 63, the server 63 executes compression processing, in which route guidance data, such as route data indicating a search route, map data indicating a map of a surrounding region of the search route, audio output data for guiding along the search route through the audio output section 37 and/or the like, is compressed to create compressed data and the compressed data is recorded in a recording unit (not shown) in the server 63.

The server 63 divides the route guidance data into surrounding data and non-surrounding data. Then, the surrounding data is provided with an administration header including position information. Subsequently, the server 63 executes compression data transmission processing to transmit the compressed data to the personal computer 61.

When the compressed data is transmitted, the CPU 71 executes recording processing to download the compressed data into the hard disk of the recording unit 74 (step S22). As described above, the CPU 71 then transmits the compressed data to the navigation device 14 (step S24). Since the operation of the navigation device 14 after compressed data is transferred is the same as that of the first embodiment, description thereof is omitted.

Since according to this exemplary embodiment, the surrounding data is decompressed immediately after the ignition switch is turned on and the navigation device 14 starts up (step S23), the vehicle can be started immediately utilizing the route guidance data.

Although according to this exemplary embodiment, the decompression processing is executed after the ignition switch is turned on, according to various other exemplary embodiments, the decompression processing may be executed at a predetermined timing after the ignition switch is turned on, for example, after the vehicle has started moving.

According to various other exemplary embodiments, route following may be carried out after the CPU 71 records compressed data in the flash memory 30 and before the CPU 71 stops the navigation device 14, and decompression of the compressed data and recording of the route guidance data are carried out. First, when a current position is detected by the GPS 21, the CPU 31 reads the current position, reads out the compressed data from the flash memory 30, and then reads the position information within the administration header of the compressed data. Subsequently, the CPU 31 determines whether the compressed data is surrounding data by comparing the current position with the position information in the administration header. If the compressed data is surrounding data, the CPU 31 decompresses the compressed data of the surrounding data, and then records the route guidance data into the hard disk of the data recording section 16. Note that it is also possible to record the data in the flash memory 30 instead of the hard disk.

If decompression of the compressed surrounding data is completed and the decompressed route guidance data is recorded in the hard disk, the CPU 31 reads out the remaining non-surrounding compressed data from the flash memory 30, decompresses the compressed data of the non-surrounding data and records the non-surrounding route guidance data into the hard disk of the data recording section 16. Note that it is also possible to record the data in the flash memory 30 instead of the hard disk.

According to the first and second exemplary embodiments, the route guidance data is divided into surrounding data and non-surrounding data, and the surrounding data is compressed with an administration header including position information, while the non-surrounding data is compressed as is (i.e., without an administration header). A third exemplary embodiment in which the surrounding data may not be compressed will be described with reference to FIGS. 9-12.

In this case, if the amount of the surrounding data is large and thus a predetermined compression condition is established, the surrounding data is compressed. If the amount of the surrounding data is small and thus the compression condition is not established, the surrounding data is not compressed. For example, a required communication time when the surrounding data is transferred from the personal computer 61 to the navigation device 14 without being compressed is assumed to be τ 1, the required communication time for the compressed surrounding data is assumed to be τ 2, and a time necessary for decompressing the compressed surrounding data (hereinafter referred to as "decompression time") is assumed to be τ 3. According to the third exemplary embodiment, if the required communication times τ 1, τ 2 and the decompression time τ 3 have the relation of τ 1>τ 2+τ 3, the compression condition is established, and if there is a relation of τ 1≦τ 2+τ 3, the compression condition is not established.

Figure 9:
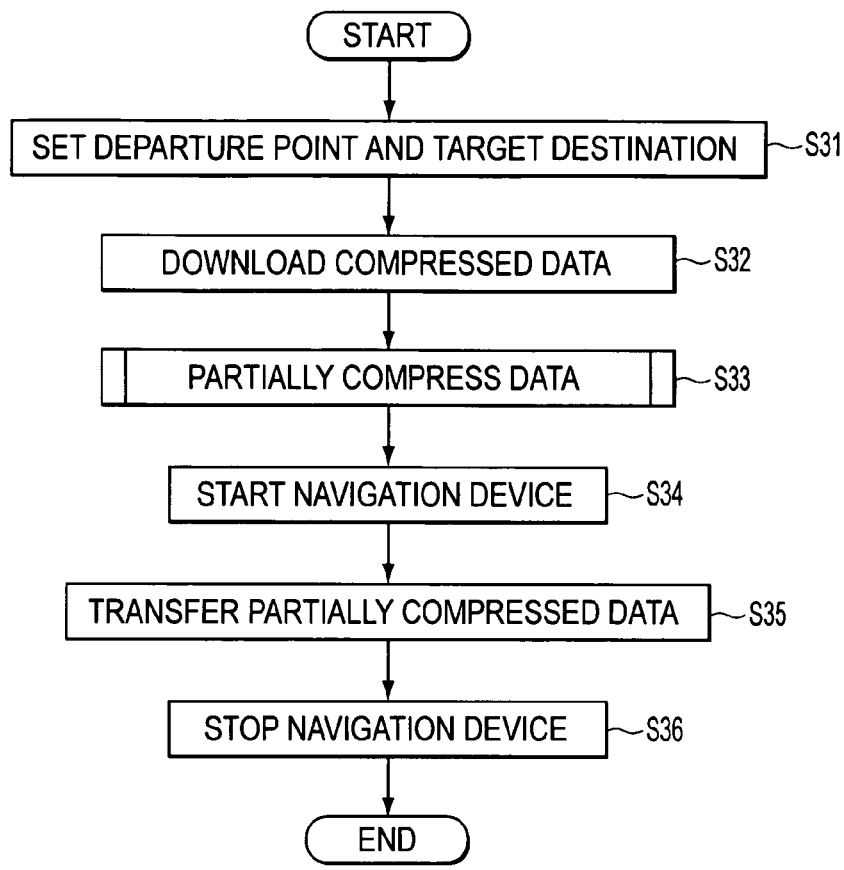
FIG. 9 is a flow chart showing the operation of a personal computer according to a third exemplary embodiment of the invention.
Figure 10:
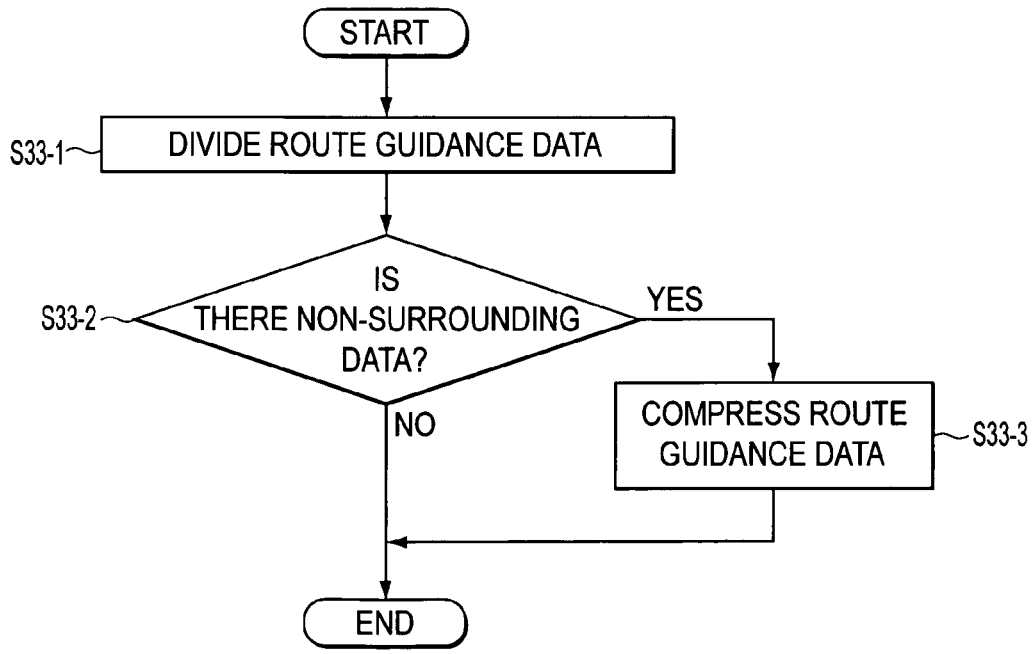
FIG. 10 is a diagram showing the sub-routine of partial compression processing according to the third exemplary embodiment of the invention.
Figure 11:
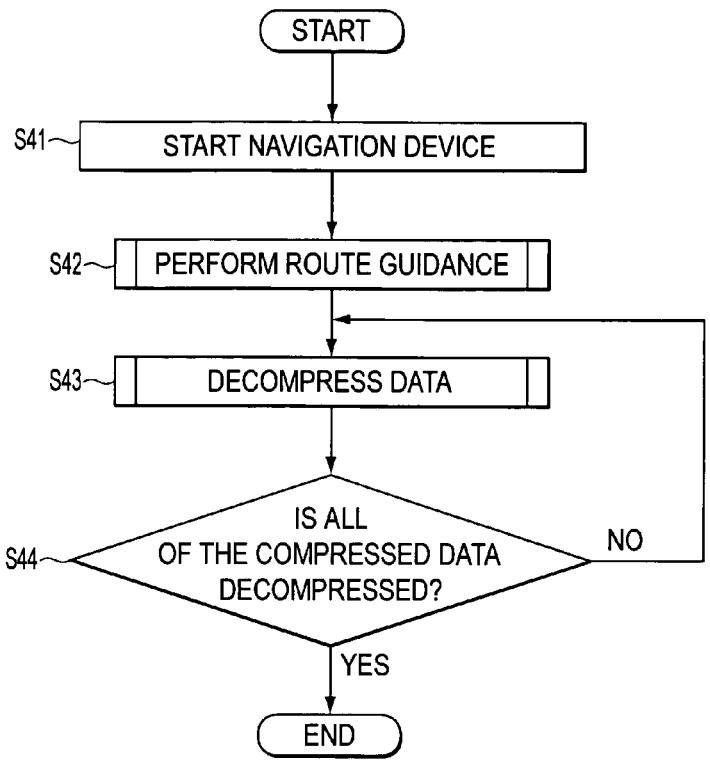
FIG. 11 is a main flow chart showing the operation of a navigation device according to the third exemplary embodiment of the invention.
Figure 12:
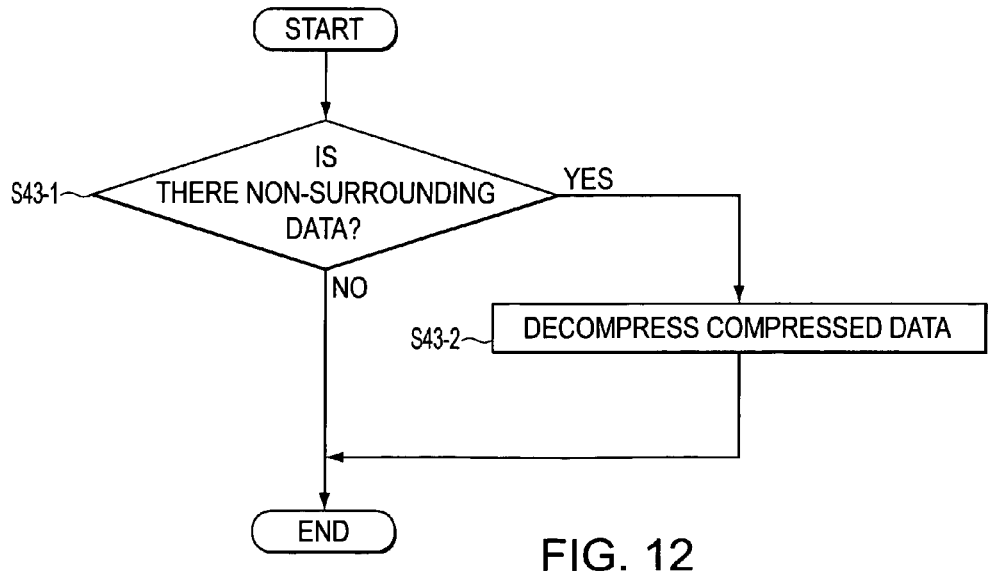
FIG. 12 is a diagram showing the sub-routine of decompression processing according to the third exemplary embodiment of the invention.

FIG. 9 is a main flow chart showing the operation of the personal computer according to the third exemplary embodiment of the invention. FIG. 10 is a diagram showing the sub-routine of a partial compression processing according to the third exemplary embodiment of the invention. FIG. 11 is a main flow chart showing the operation of the navigation device according to the third exemplary embodiment of the invention. FIG. 12 is a diagram showing the sub-routine of decompression processing according to the third exemplary embodiment of the invention.

First, if the operator inputs a departure point and a target destination by operating the operating section 73 of the personal computer 61 (FIG. 1), the CPU 71 executes search condition set processing, in which the departure point and target destination are set as search conditions (step S31) and then, the search condition is transmitted to the information center 62.

When the search condition is received by the server 63, the server 63 executes information obtainment processing to obtain information necessary for searching for a route by reading the search data in the navigation database 64, reading statistical data in the navigation database 64, and reading traffic information transmitted from the VICS (registered trade mark) center.

Then, the server 63 executes search processing to search for a route based on the search data, the traffic information, the statistical data, and the like, according to the search conditions. When a route is searched for by the search processing means, the server 63 executes route search data transmission processing, in which route data indicating a search route, map data indicating a surrounding map of the search route, audio output data for guiding along the search route by the voice output section 37 (FIG. 2) and the like are transmitted to the personal computer 61 as route guidance data.

When the route guidance data is transmitted, the CPU 71 executes recording processing, in which the route guidance data is downloaded into the hard disk of the recording unit 74 (step S32). Next, the CPU 71 executes a partial compression processing (step S33) to read out the route guidance data from the hard disk and divide the route guidance data into surrounding data and non-surrounding data (step S34). The CPU 71 records the non-compressed surrounding data into the flash memory. The non-surrounding route guidance data is compressed with an administration header (step S33-3). Thus, partially compressed data is created and then recorded in the flash memory of the recording unit 74.

If the partially compressed data is created in this way, the CPU 71 transmits the partially compressed data to the navigation device 14. If the operator instructs a start of the navigation device 14 by operating the operating section 73, the CPU 71 executes navigation device start-up processing, to turn on the navigation device 14 to start the navigation device 14 (step S34). Subsequently, the CPU 71 executes data transferring processing to read out the partially compressed data from the flash memory of the recording unit 74 and transmit it to the navigation device 14 (step S35). The CPU 31 in the navigation device 14 executes partially compressed data recording processing to record the partially compressed data into the flash memory 30.

If all the partially compressed data is recorded in the flash memory 30, the CPU 71 executes navigation device stop processing to stop the navigation device 14 (step S36) so that the partially compressed data is stored in the navigation device 14 and available.

Next, the operation of the navigation device 14 when a vehicle is driven will be described. When the ignition switch of a vehicle is turned on, the navigation device 14 starts up (step S41), so that a current position is detected by the GPS 21, and the direction of the vehicle is detected based on, for example, the turning angle of the vehicle detected by the gyro sensor 26.

Then, the CPU 31 executes route guidance processing to read out the partially compressed data from the flash memory 30. For the surrounding data, the CPU 31 forms a map screen on the display of the display section 35 based on the non-compressed route guidance data in the partially compressed data. The CPU 31 displays a current position, a surrounding map, the direction of the vehicle, and a search route in the surrounding area of the current position (step S42). The CPU 31 can also notify a driver of the search route with a message from the audio output section.

If the route guidance starts up in this way, the CPU 31 can execute decompression processing (step S43) and decompresses the non-surrounding data (step S43-2) of the partially compressed data and record the route guidance data into the hard disk of the data recording section 16. Note that the data may be recorded in the flash memory 30 instead of the hard disk.

As for the surrounding data, if the ignition switch is turned on to activate the navigation device 14, the route guidance data is read without being decompressed, so that a vehicle can be run immediately using the route guidance data.

Figure 13:
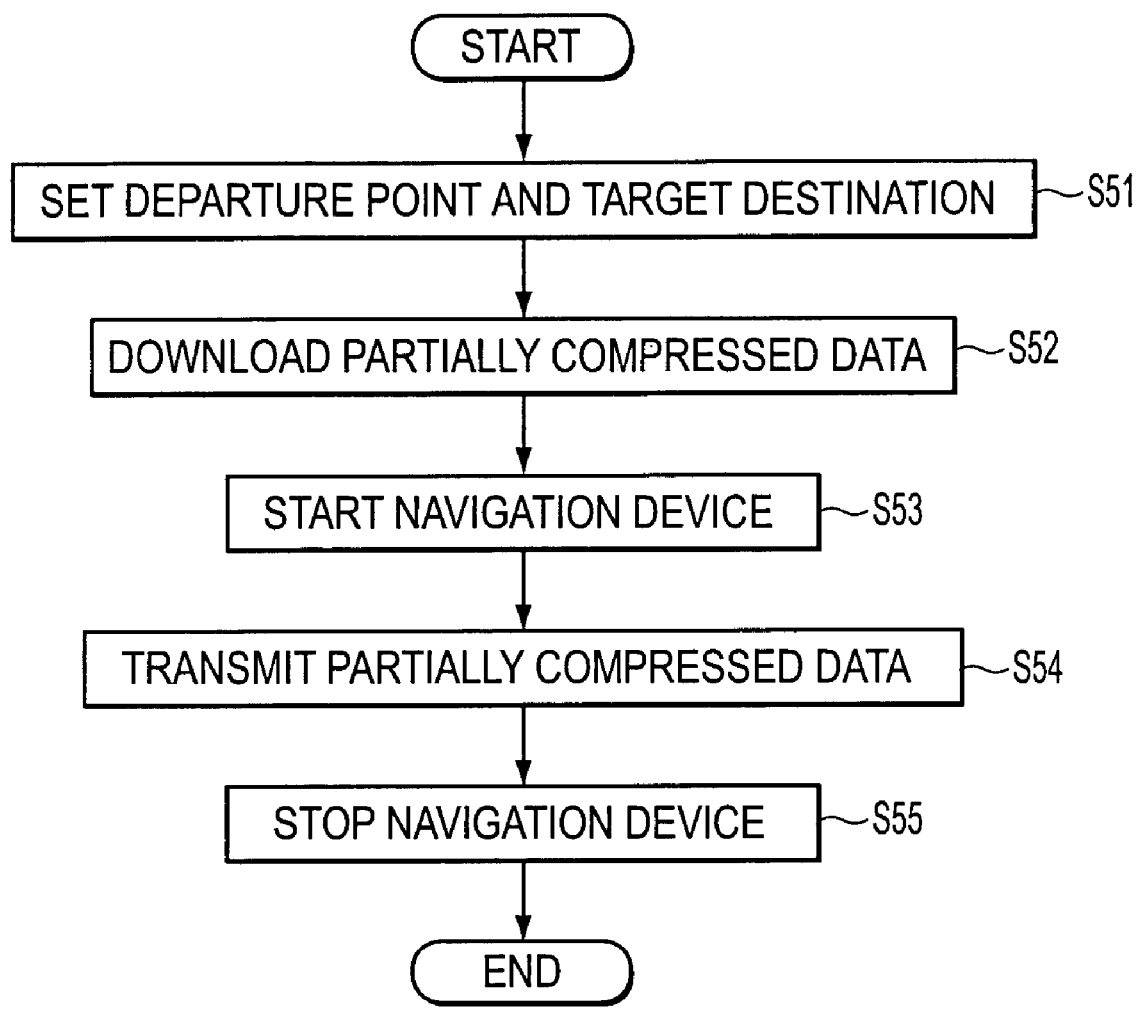
FIG. 13 is a main flow chart showing the operation of a personal computer according to a fourth exemplary embodiment of the invention.

Next, the fourth exemplary embodiment of the invention, in which the compression processing is executed by compressing the non-surrounding data without compressing the surrounding data by the information center 62, will be described with reference to FIG. 13. FIG. 13 is a main flow chart showing the operation of the personal computer according to the fourth exemplary embodiment of the invention. First, if the operator inputs a departure point and a target destination by operating the operating section 73 of the personal computer 61 (FIG. 1). The CPU 71 executes search condition set processing, in which the departure point and target destination are set as search conditions (step S51) and then, the search conditions are transmitted to the information center 62.

When the search condition is received by the server 63, the server 63 executes information obtainment processing to obtain information necessary for searching for a route by reading the search data in the navigation database 64, reading statistical data in the navigation database 64, and reading traffic information transmitted from the VICS (registered trade mark) center.

Subsequently, the server 63 executes search processing to search for a route based on the search data, the traffic information, the statistical data and the like according to the search conditions.

If a route is searched for by the server 63, the server 63 executes a partial compression processing, in which route guidance data, such as data indicating a search route, data indicating a map of a surrounding region of the search route, audio output data for guiding along the search route using the audio output section 37 (FIG. 2) and the like, as the route guidance data is compressed to create partially compressed data, and the partially compressed data is recorded in a recording unit in the server 63.

In this case, the server 63 divides the route guidance data into surrounding data and non-surrounding data. The partially compressed data includes non-compressed surrounding data and compressed non-surrounding data. Subsequently, the server 63 executes partially compressed data transmission processing to transmit partially compressed data to the personal computer 61.

Then, when the partially compressed data is transmitted, the CPU 71 executes recording processing to download the partially compressed data into the hard disk of the recording unit 74 (step S52). Next, the CPU 71 transfers the partially compressed data to the navigation unit 14 as described above. Note that, since the operation of the navigation device 14 after the partially compressed data is transferred is the same as that of the third embodiment, description thereof is omitted.

Figure 14:
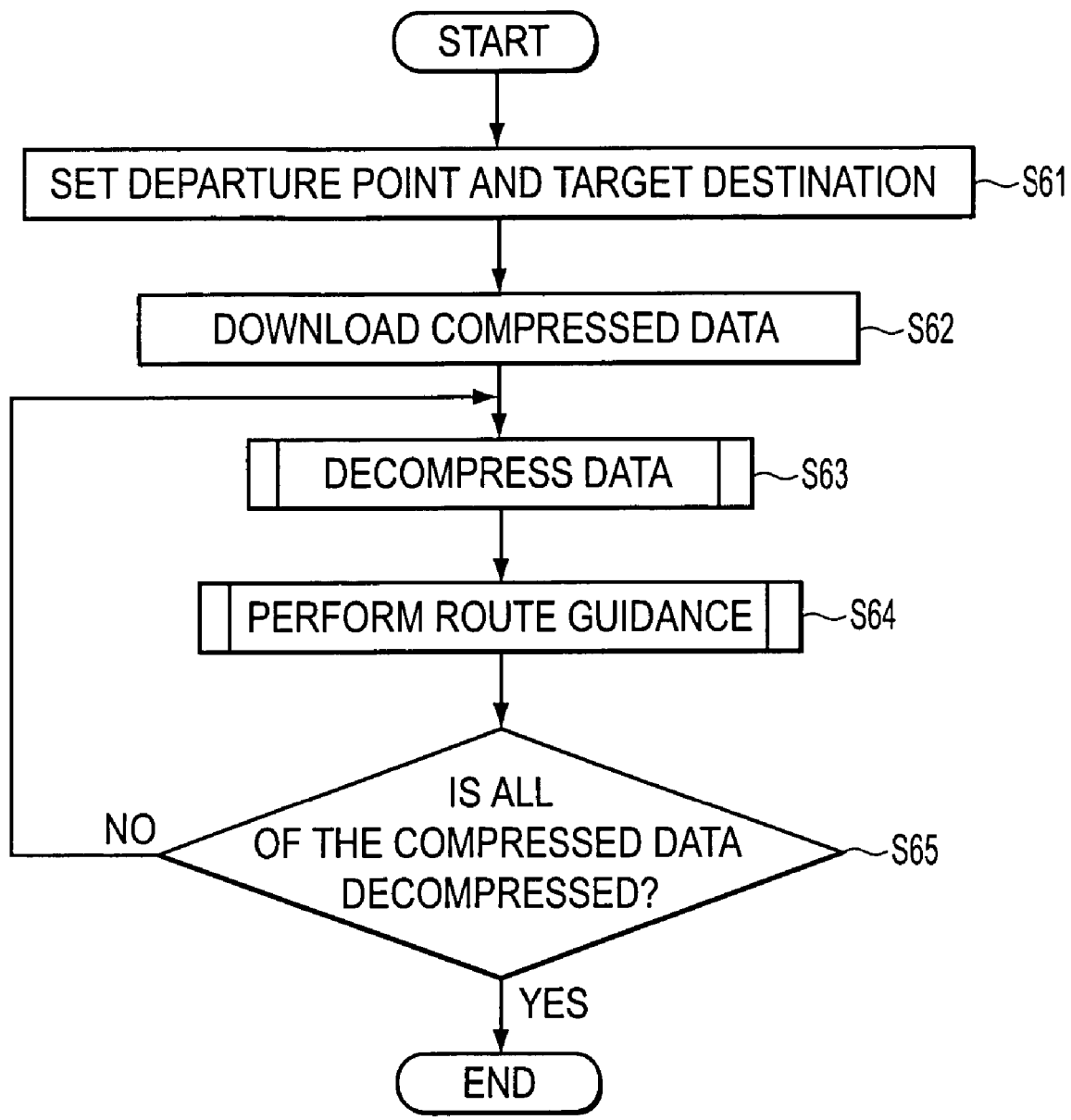
FIG. 14 is a main flow chart showing the operation of a navigation device according to a fifth exemplary embodiment of the invention.

According to the second and fourth exemplary embodiments, compressed data and partially compressed data and the like may be transmitted from the information center 62 and downloaded into the hard disk of the personal computer 61 and the compressed data, partially compressed data and the like are transferred to the navigation device 14. According to the fifth exemplary embodiment in which the compressed data transmitted from the information center 62 is received directly by the navigation device 14 will be described with reference to FIG. 14. According to the fifth exemplary embodiment, the navigation device 14 and the information center 62 can be connected to each other via the network 43 constituted of, for example, portable phone network so as to enable bi-directional communication. For that purpose, the communication section 38 may be a portable phone and can communicate with the server 63 of the information center 62 via a base station (not shown). FIG. 14 is a main flow chart showing the operation of a navigation device according to the fifth exemplary embodiment of the invention.

If the ignition switch of a vehicle is turned on, the navigation device 14, which is an on-board device (FIG. 2), starts so that a current position is detected by the GPS 21 and the direction of the vehicle is detected based on the turning angle of the vehicle detected by the gyro sensor 26.

If the operator inputs a departure point and a target destination by operating the input section 34 in the navigation device 14, the CPU 31 executes search condition set processing, in which a departure point and a target destination are set up as search conditions (step S61), and then transmits the search condition to the information center 62 which is an information provider.

Next, when the search conditions are received by the server 63 (FIG. 1), the server 63 executes information obtainment processing to read out the search data in the navigation database 64, and then reads out statistical data and reads traffic information transmitted from the VICS (registered trade mark) center to obtain information necessary for searching for a route. The server 63 searches for a route based on search data, traffic information, statistical data and the like according to the search conditions.

If a route is searched for by the server 63, the server 63 executes compression processing and compresses route data indicating a search route, map data indicating a map of a surrounding region of the search route, audio output data for guiding along the search route by the audio output section 37 and the like as the route guidance data and records the compressed data in the recording unit of the server 63.

In this case, the server 63 divides the route guidance data into surrounding data and non-surrounding data and creates compressed data supplied with an administration header. The surrounding data in the route guidance data includes position information. Subsequently, the server 63 executes compressed data transmission processing to transmit the compressed data to the navigation device 14.

When the compressed data is transmitted, the CPU 31 in the navigation device 14 executes reception processing to receive compressed data. The compressed data recording processing means of the CPU 31 executes compressed data recording processing, in which the compressed data is downloaded into the flash memory 30 and recorded (step S62).

Subsequently, the CPU 31 executes decompression processing to decompress compressed data (step S63). Thus, the CPU 31 reads a current position, reads out compressed data from the flash memory 30, and then reads position information in the administration header of the compressed data. The CPU 31 determines whether the compressed data is surrounding data by comparing the current position with position information from the administration header. If the compressed data is surrounding data, it decompresses the compressed data and records the decompressed route guidance data into the hard disk of the data recording section 16. Note that the data may be recorded in the flash memory 30 instead of the hard disk.

The CPU 31 executes route guidance processing to read out the route guidance data from the hard disk of the data recording section 16 and forms a map screen on a display of the display section 35 based on the route guidance data. The CPU 31 can also display a current position, a map of a surrounding region, the direction of the vehicle on the map screen, and a search route in the surrounding region of the current position. The CPU 31 can notify a driver of the search route with voice through a message from the voice output section in order to execute route guidance (step S64). Thus, the driver can drive a vehicle according to the current position, a map of a surrounding region, direction of the vehicle, and search route displayed on the map screen.

If decompression of the compressed data on the surrounding data is completed (step S65) and the route guidance data is recorded in the hard disk, the CPU 31 reads out the remaining compressed data from the flash memory 30 and decompresses the compressed data on the non-surrounding data and then records the non-surrounding route guidance data into the hard disk of the data recording section 16. Note that the data may be recorded in the flash memory 30 instead of the hard disk.

Figure 15:
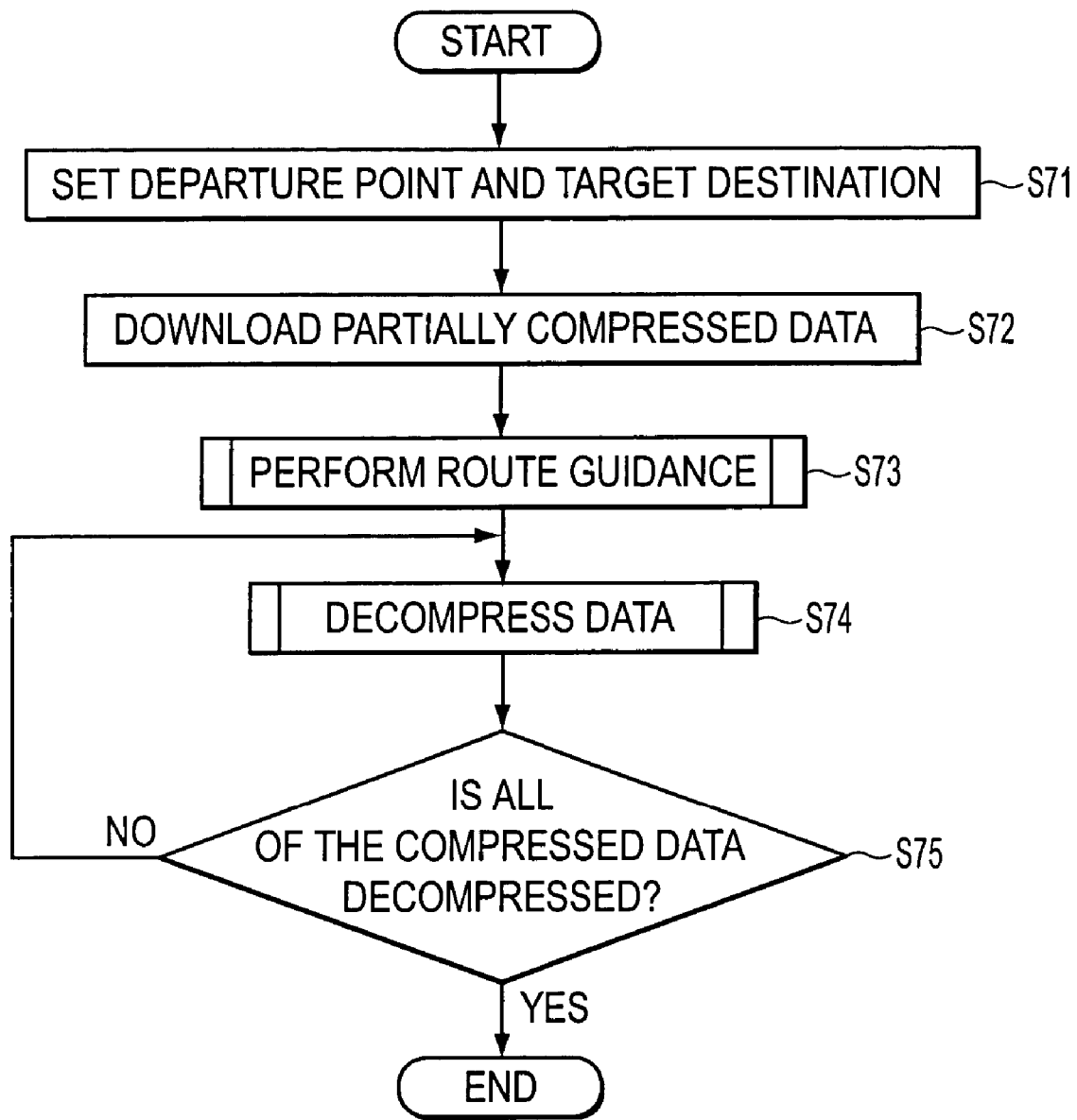
FIG. 15 is a main flow chart showing the operation of a navigation device according to a sixth exemplary embodiment of the invention.

Next, a sixth exemplary embodiment in which partially compressed data transmitted from the information center 62 is directly received by the navigation device 14 will be described with reference to FIG. 15. FIG. 15 is a main flow chart showing the operation of the navigation device according to the sixth exemplary embodiment of the invention.

If the ignition switch of a vehicle is turned on, the navigation device 14 starts so that a current position is detected by the GPS 21 and the direction of the vehicle is detected based on the turning angle of the vehicle detected by the gyro sensor 26.

If the operator inputs a departure point and a target destination by operating the input section 34 in the navigation device 14, the CPU 31 executes search condition set processing, in which a departure point and a target destination are set (step S71) and then, transmits the search conditions to the information center 62 (FIG. 1).

When the search condition is received by the server 63, the server 63 executes information obtainment processing to read out the search data in the navigation database 64 and then reads out statistical data and reads traffic information transmitted from the VICS (registered trade mark) center to obtain information necessary for searching for a route. The server 63 searches for a route based on search data, traffic information, statistical data, and the like according to the search conditions.

When a route is searched for by the server 63, the server 63 executes partial compression processing and partially compresses the route guidance data, such as route data, map data of a surrounding region of the search route, audio output data and the like, as the route guidance data and records the partially compressed data in the recording unit of the server 63.

The server 63, in order to create the partially compressed data, divides the route guidance data into surrounding data and non-surrounding data (e.g., step S33-1), and only compresses the non-surrounding data (e.g., step S33-3). Subsequently, the server 63 executes partially compressed data transmission processing to transmit the partially compressed data to the navigation device 14.

When the partially compressed data is transmitted, the CPU 31 executes partially compressed data recording processing to download the partially compressed data into the flash memory 30 (step S72).

Next, the CPU 31 executes route guidance processing to read out the partially compressed data from the flash memory 30 and forms a map screen on a display of the display section 35 based on the non-compressed surrounding data of the partially compressed data, and indicates a current position, a map of a surrounding region, the direction of the vehicle on the map screen, and then notifies the driver of a search route with a message from the audio output section for guidance of the search route (step S73).

After the route guidance starts, the CPU 31 executes partial decompression processing, and decompresses the non-surrounding compressed data (e.g., step S43-2) in the partially compressed data (step S74) into the hard disk of the data recording section 16 until it has all been decompressed (step S75).

According to the first, second and fifth exemplary embodiments, the CPU 31 reads out the compressed data from the flash memory 30 after a vehicle starts traveling and decompresses the compressed non-surrounding data. However, while traveling, the current position of the vehicle changes. Therefore, it is possible to compare an updated current position with position information of the non-surrounding data of an area near the updated current position, decompress that data and record the decompressed data in the hard disk of the data recording section 16. In this case, an administration header with position information must also be provided for the non-surrounding data. Additionally, it is possible to include data within the administration header that links the data for one area with the data for areas surrounding that area and decompress such surrounding data successively the current position is updated.

The non-surrounding data can also be divided into a plurality of small divided data portions. The surrounding data and each small divided non-surrounding data portion can be compressed at different compression rates. Thus, according to the seventh exemplary embodiment the non-surrounding data is divided into route-surrounding data as a first small divided data portion and non-route-surrounding data as a second small divided data portion. Note that, since the method steps until the route guidance data transmitted from the information center 62 to the personal computer 61 is recorded in the hard disk of the recording unit 74 is the same as that of the first exemplary embodiment, description thereof will be omitted.

Figure 16:
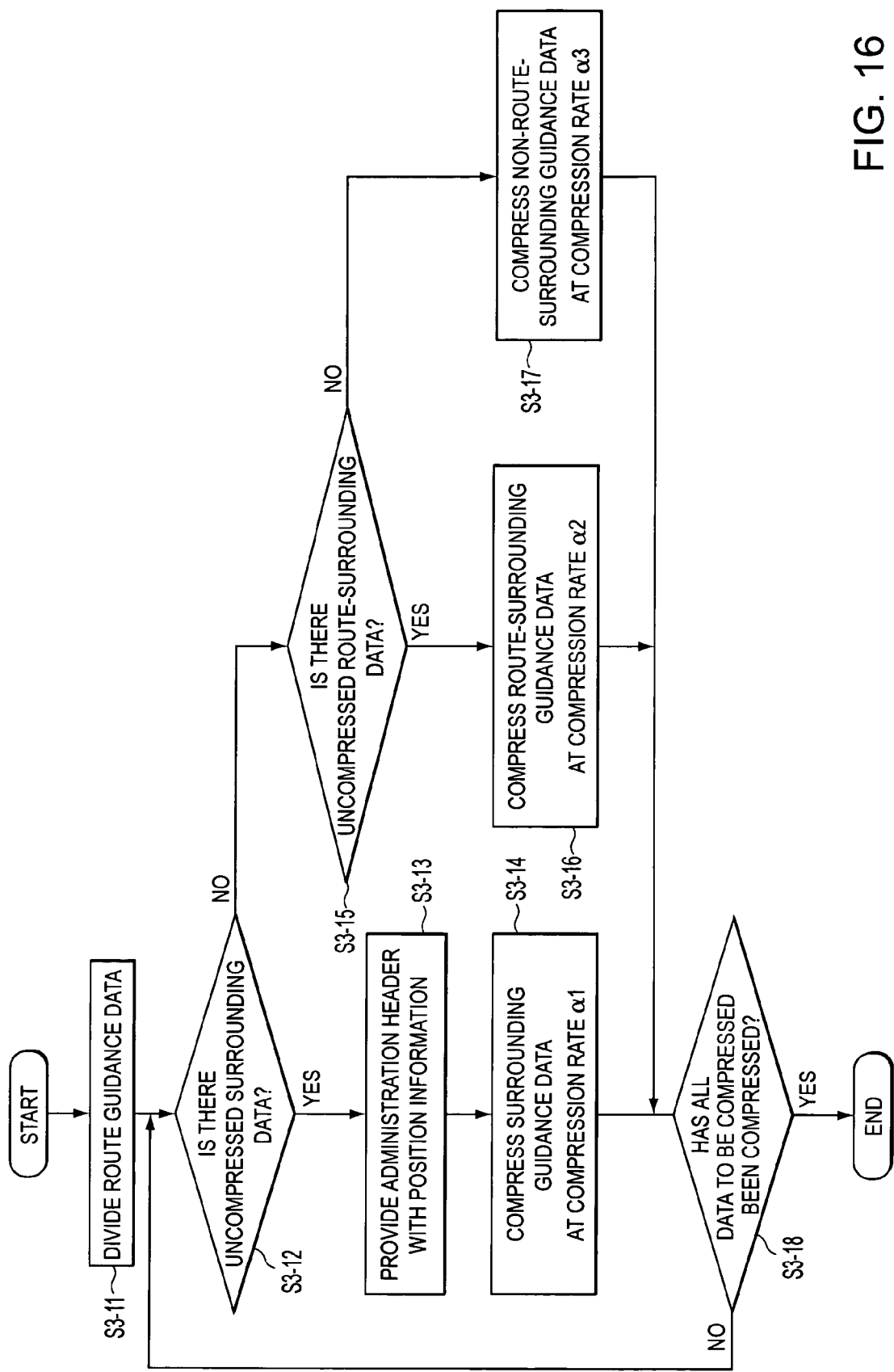
FIG. 16 is a diagram showing the sub-routine of compression processing according to a seventh exemplary embodiment of the invention.
Figure 17:
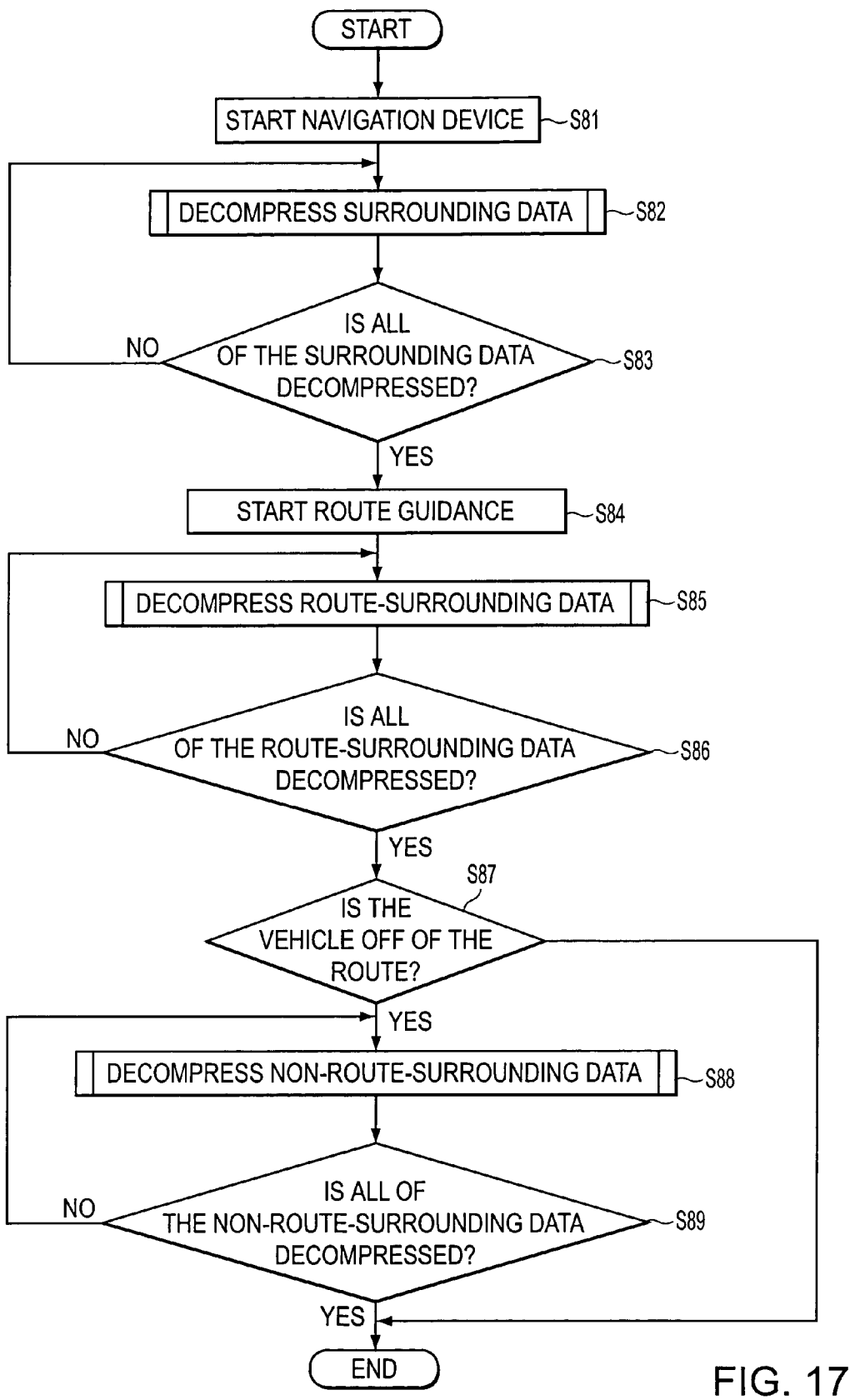
FIG. 17 is a flow chart showing the operation of the navigation device according to the seventh exemplary embodiment of the invention.
Figure 18:
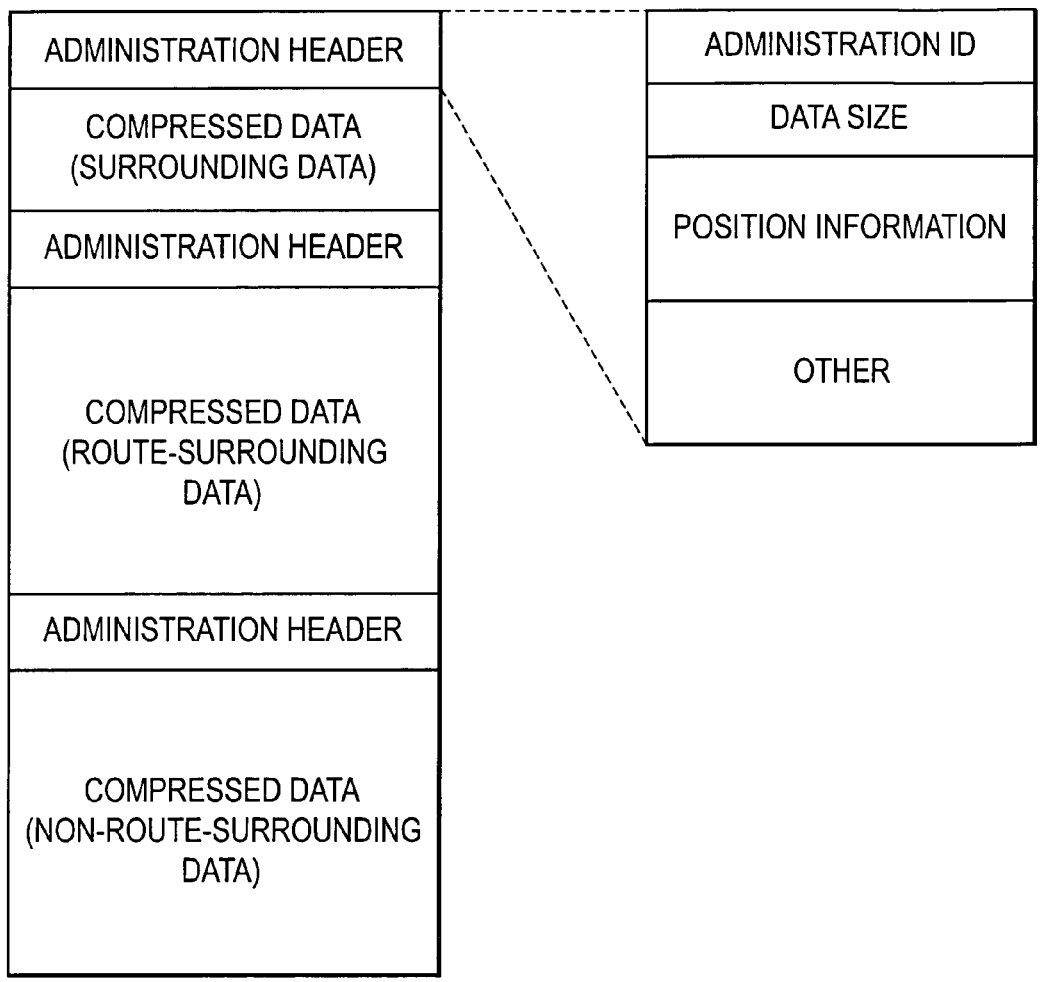
FIG. 18 is a diagram showing the data configuration of compressed data according to the seventh exemplary embodiment of the invention.
Figure 19:
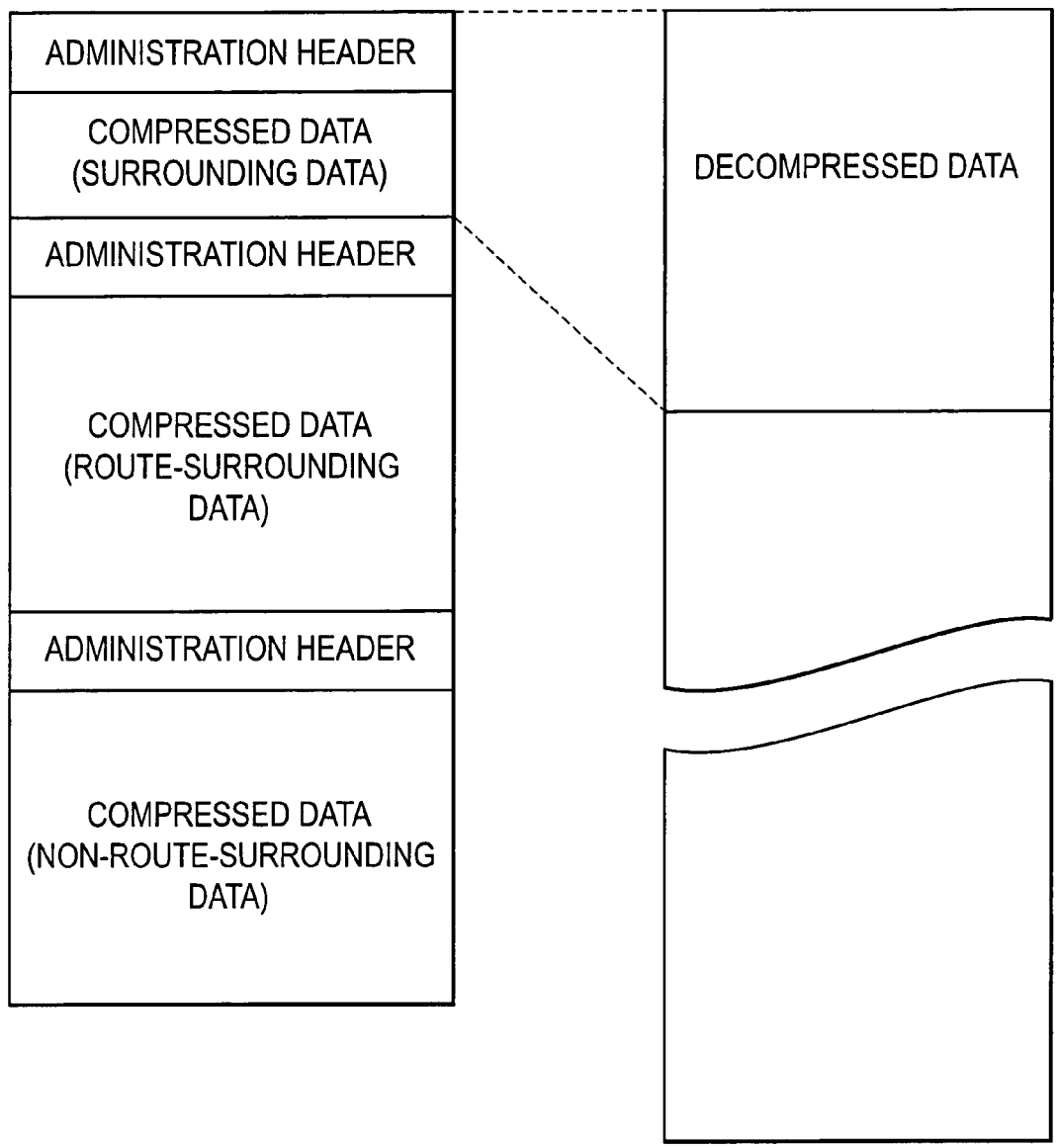
FIG. 19 is a diagram showing the data configuration upon decompression processing of surrounding data according to the seventh exemplary embodiment of the invention.

FIG. 16 is a diagram showing the sub-routine of compression processing according to the seventh exemplary embodiment of the invention. FIG. 17 is a flow chart showing the operation of the navigation device according to the seventh exemplary embodiment of the invention. FIG. 18 is a diagram showing the data structure of compressed data according to the seventh exemplary embodiment of the invention. FIG. 19 is a diagram showing the data structure upon decompression processing of surrounding data according to the seventh exemplary embodiment of the invention.

According to the seventh exemplary embodiment, the CPU 71 in the personal computer 61 (FIG. 1), executes compression processing to read out the route guidance data from the hard disk and divide the route guidance data into surrounding data, route-surrounding data and other non-route-surrounding data (step S3-11). The route-surrounding data is, for example, route guidance data in an area or areas adjacent to areas surrounding the search route.

The CPU 71 compresses the route guidance data on the surrounding data, route-surrounding data and non-route-surrounding data to create compressed data supplied with an administration header and records each compressed data into the flash memory of the recording unit 74. In this case, different compression rates α1-α3 of the surrounding data, route-surrounding data and non-route-surrounding data are set up. Since the surrounding data needs to be decompressed immediately after the ignition switch in the navigation device 14 is turned on, the compression rate α1 is set low. Since the route-surrounding data is decompressed after the vehicle has started traveling, the compression rate α2 is set to a medium level. And since the non-route-surrounding data is decompressed after the traveling of a vehicle is started, for example, when a vehicle goes off a search route so that an off route (leaving the route) occurs, the compression rate α3 is set to a high level. Consequently, the compression rates α1-α3 are set into the relation of α3<α2<α1. The compression rates α1-α3 may be expressed in percentage to the data amount before a compression, and the higher the compression rate α1-α3, the smaller the percentage value, while the lower the compression rate α1-α3, the larger the percentage value.

The CPU 71 compresses the route guidance data about the surrounding data at the compression rate α1 (step S3-14), about the route-surrounding data at the compression rate α2 (step S3-16), and about the non-route-surrounding data at the compression rate α3 (step S3-17) to create compressed data supplied with an administration header (step S3-13) and record the each compressed data into the flash memory of the recording unit 74. Note that the administration header is information for controlling compressed data and as shown in FIG. 18, includes an administration ID identifying the compressed data, data size indicating the size of the compressed data and other data. The data size of the surrounding data with respect to the data amount of compressed data thereof is large, the data size of the route-surrounding data with respect to the data amount of the compressed data thereof is medium, and the data size of the non-route-surrounding data with respect to the data amount of the compressed data thereof is small.

The CPU 71 determines whether the divided route guidance data is surrounding data (step S3-12). Then, if the divided route guidance data is surrounding data, an administration header is supplied with position information or the like accompanied by compression (step S3-13). Although according to this embodiment, the position information is expressed with, for example, coordinate, it may be expressed with a road number, node number or the like.

If the compressed data is created in this way, the CPU 71 executes compressed data transmission processing to transfer the compressed data to the navigation device 14. Thus, if an operator starts the navigation device 14 by operating the operating section 73, the CPU 71 executes navigation device start processing to turn on the navigation device 14. Subsequently, the CPU 71 executes data transmission processing to read out compressed data from the flash memory of the recording device 74 and transfer the compressed data to the navigation device 14. The CPU 31 (FIG. 2) in the navigation device 14 executes compressed data recording processing to record compressed data into the flash memory 30.

When all of the compressed data is recorded in the flash memory 30, the CPU 71 executes navigation device stop processing to stop the navigation device 14.

Because the route guidance data is transmitted from the personal computer 61 to the navigation device 14 in a compressed form, the data size of the data is reduced. Furthermore, because the compression rate α2 of the route-surrounding data is higher than the compression rate α1 of the surrounding data, and the compression rate α3 of the non-route-surrounding data is higher than the compression rate α2 of the route-surrounding data, the data size of the compressed data can be reduced to about ⅓. Thus, the required communication time becomes sufficiently short and a time in which the navigation device 14 is powered on may be reduced sufficiently, so that power consumed by the navigation device 14 is decreased. Consequently, load applied to a battery mounted on a vehicle can be decreased.

It should be appreciated that the speed of decompressing the surrounding data is higher than the decompressing speed of the route-surrounding data by the same degree that the compression rate α1 is lower than the compression rate α2, and the decompressing speed of the route-surrounding data is higher than the decompression speed of the non-route-surrounding speed by the same degree that the compression rate α2 is lower than the compression rate α3.

Next, the operation of the above-described navigation device 14 when a vehicle is driven will be described. First, if the ignition switch of a vehicle is turned on, the navigation device 14 starts (step S81), so that a current position is detected by the GPS 21 and the direction of the vehicle is detected based on a turning angle of the vehicle detected by the gyro sensor 26.

Next, the CPU 31, executes surrounding data decompression processing to decompress the surrounding compressed data giving priority to that data surrounding data that is closest to a current position. Thus, the CPU 31 reads a current position of the vehicle, reads out compressed data from the flash memory 30, and reads the position information in the administration header of the compressed data. The CPU 31 determines whether the compressed data is surrounding data by comparing a current position of the vehicle with the position information or the compressed surrounding data. If the compressed data is surrounding data, the compressed data on the surrounding data is decompressed giving priority to that data closest to the current position as shown in FIG. 19 and the decompressed route guidance data, which is the decompressed data, is recorded in the hard disk of the data recording section 16 (step S82). Note that the data may be recorded in the flash memory 30 instead of the hard disk.

Then, the CPU 31 executes route guidance processing to determine whether all surrounding data is decompressed (step S83), and if all of the surrounding data is decompressed, the route guidance is started (step S84). Accordingly, the CPU 31 reads out route guidance data from the hard disk of the data recording section 16, forms a map screen on a display of the display section 35 based on the route guidance data, displays a current position, a map of a surrounding region and the direction of the vehicle on the map screen, displays a search route in the surrounding region of the current position, and notifies a driver of the search route with a message from the audio output section 37 for guidance of the route.

Subsequently, the CPU 31, executes route-surrounding data decompression processing, in which the compressed route surrounding data is decompressed (step S85) and recorded in the hard disk of the data recording section 16.

The route guidance processing means determines whether route-surrounding data is decompressed (step S86). If all the route-surrounding data is decompressed, the route guidance data is read out from the hard disk of the data recording section 16 and the map screen is formed on a display of the display section 35 based on the route guidance data. The display section 35 displays a current position, a map of a surrounding region and the direction of the vehicle on the map screen, displays a search route in the surrounding region of the current position, and notifies a driver of the search route with audio through a message from the audio output section 37 in order to execute route guidance.

When a vehicle is driven along a search route, a driver may intentionally or by mistake drive the vehicle along a mistaken route different from the search route. Thus, the CPU 31 may execute off route determination processing, in which it reads a current position and determines whether or not the vehicle is off of the route based on the current position and route data (step S87). If the vehicle is off of the route, the CPU 31 executes the non-route-surrounding data decompression processing to decompress the non-route-surrounding data (step S80) and records the non-route-surrounding route guidance data into the hard disk of the data recording section 16.

It should be appreciated that the non-route-surrounding data decompression may give preference to the non-route-surrounding data that is most likely to be utilized for a re-search, solely as non-route surrounding data in areas between the current position and the original route.

The CPU 31 executes re-search processing to first determine whether all (or the pertinent portion) of the non-route-surrounding data is decompressed (step S89). If all non-route-surrounding data is decompressed, the current position and non-route-surrounding data are read in and a route from a current position to the original search route is re-searched for according to the non-route-surrounding data.

Although according to this exemplary embodiment, the compression processing is executed by the personal computer 61, according to various other exemplary embodiments, the compression processing may be carried out in the information center 62. Thus, in the compression processing of the information center 62, the route guidance data is divided into surrounding data and non-surrounding data, and the non-surrounding data is further divided into route-surrounding data and other non-route-surrounding data and then, the surrounding data, route-surrounding data and non-route-surrounding data are compressed at the respective compression rates α1-α3.

According to an eighth exemplary embodiment, if the amount of the surrounding data is large and a predetermined compression condition is established, the surrounding data is compressed. However, if the amount of surrounding data is small and the compression condition is not established, the surrounding data is not compressed. For example, if a required communication time when the surrounding data is transferred from the personal computer 61 to the navigation device 14 without being compressed is τ1, the required communication time for the compressed data of the surrounding data is τ2 and a decompression time is τ3, when the communication required time τ1, τ2 and the decompression time τ3 are in the relation of τ1>τ2+τ3, a compression condition is established, and if there is a relation of τ1≦τ2+τ3, the compression condition is not established. Because the method until the route guidance data transmitted from the information center 62 to the personal computer 61 is recorded in the hard disk of the recording device 74 is the same as that of the third exemplary embodiment, a description thereof is omitted.

Figure 20:
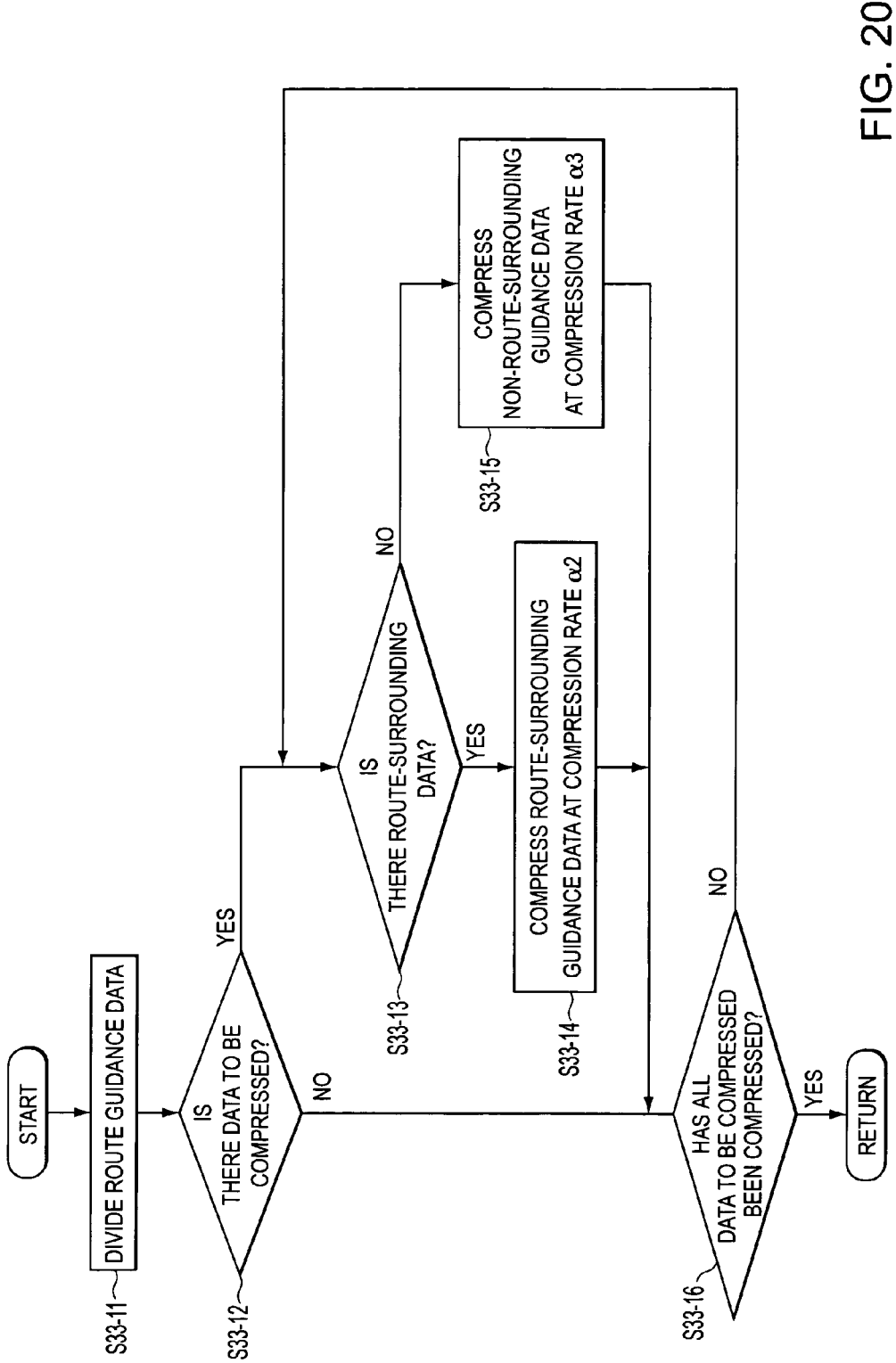
FIG. 20 is a diagram showing the sub-routine of a partial compression processing according to an eighth exemplary embodiment of the invention.
Figure 21:
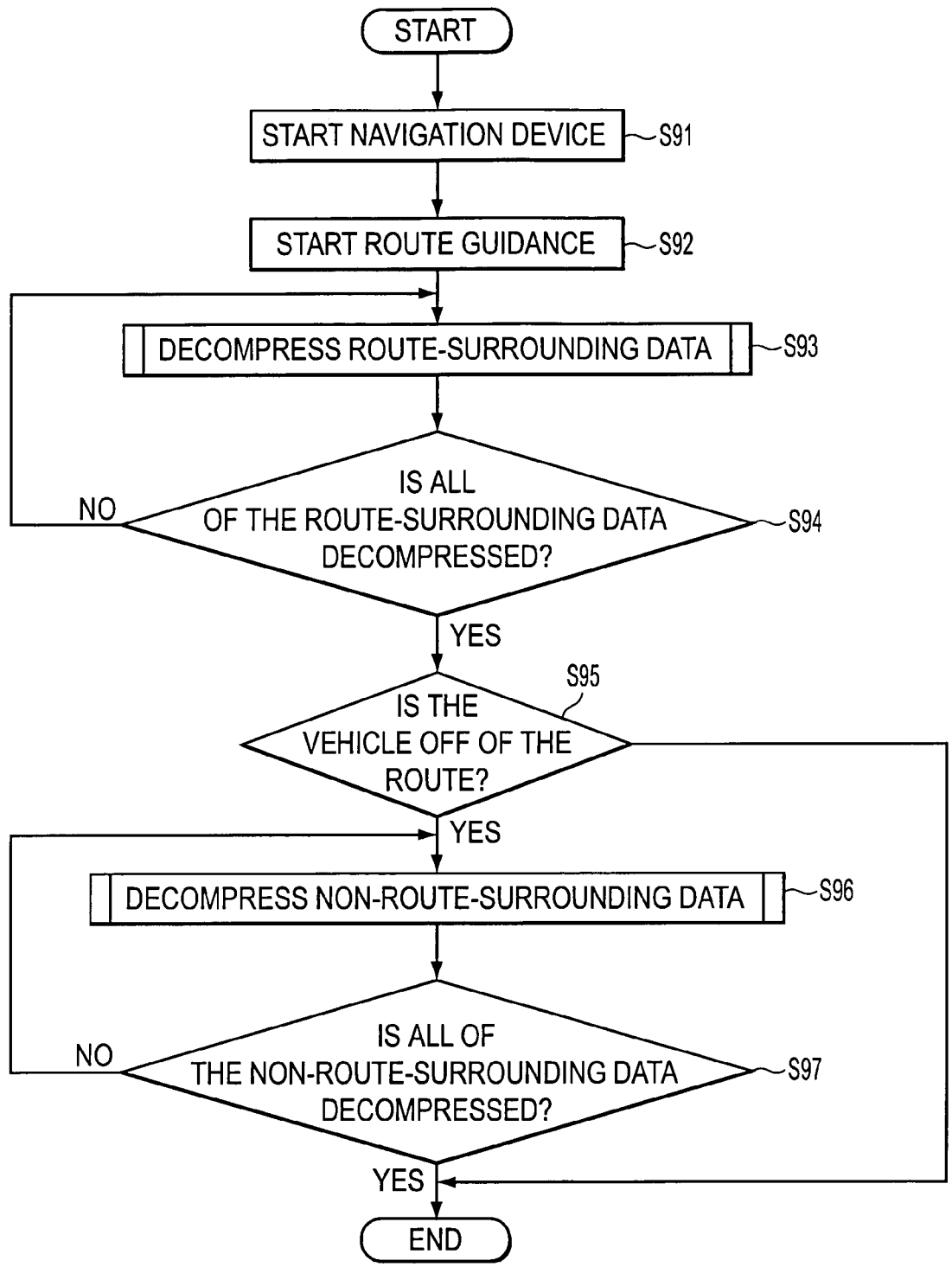
FIG. 21 is a flow chart showing the operation of the navigation device according to the eighth exemplary embodiment of the invention.

FIG. 20 is a diagram showing the sub-routine of partial compression processing according to the eighth exemplary embodiment of the present invention. FIG. 21 is a flow chart showing the operation of the navigation device according to the eighth exemplary embodiment of the present invention.

In this case, in the personal computer 61 (FIG. 1) the CPU 71 executes partial compression processing to read out route guidance data indicating information for route guidance from the hard disk and divide the route guidance data into surrounding data and non-surrounding data (step S33-11). The non-surrounding data is further divided into route-surrounding data and other non-route-surrounding data. Subsequently, the route-surrounding data is compressed at the compression rate α2 (step S33-14), and the non-route-surrounding data is compressed at the compression rate α3 (step S33-15) to create partially compressed data supplied with an administration header thereby creating partially compressed data.

When the partially compressed data is created in this way, the CPU 71 can transfer the partially compressed data to the navigation device 14. Thus, if an operator starts the navigation device 14 by operating the operating section 73, CPU 71 executes navigation device start processing, in which the navigation device 14 starts up. Subsequently, the CPU 71 executes data transfer processing to read out the partially compressed data from the hard disk of the recording device 74 and transmit it to the navigation device 14. In the navigation device 14, the CPU 31 (FIG. 2) executes partially compressed data recording processing to record the partially compressed data into the flash memory 30.

Once all of the partially compressed data is recorded in the flash memory 30, the CPU 71 executes navigation device stop processing to stop the navigation device 14. The partially compressed data is now available for route guidance.

Although according to this embodiment, the route guidance data is compressed at the compression rate α2 for the route-surrounding data while for the non-route-surrounding data, is compressed at the compression rate α3, alternatively the route guidance data may be compressed at other compression rates, for example, the route-surrounding data may be compressed at compression rate α1 which is lower than the compression rate α2 and the non-route-surrounding data may be compressed at the compression rate α2 which is lower than the compression rate α3.

Next, the operation of the navigation device 14 when a vehicle is driven will be described. First, if the ignition switch of a vehicle is turned on, the navigation device 14 starts (step S91), so that a current position is detected by the GPS 21 and the direction of the vehicle is detected based on a turning angle of the vehicle detected by the gyro sensor 26.

The CPU 31 executes route guidance processing so as to read out the partially compressed data from the flash memory 30, and forms a map screen on a display of the display section 35 based on the non-compressed surrounding data of the partially compressed data. The CPU 31 displays a current position, a map of a surrounding region and the direction of the vehicle on the map screen, displays a search route in the surrounding region of the current position, and notifies a driver of the search route with audio through a message from the audio output section in order to execute route guidance (step S92).

When the route guidance starts up in this way, the CPU 31 executes route-surrounding data decompression processing in which it decompresses the compressed route-surrounding data and then records the route-surrounding data into the hard disk of the data recording section 16 (step S93). Then, the CPU 31 determines whether or not all route-surrounding data is decompressed (step S94).

If all route-surrounding data is decompressed, the CPU 31 executes off route determination processing to read a current position and determines whether the vehicle is off of the route based on the current position and route data (step S95). If the vehicle is off of the route, the CPU 31 executes non-route-surrounding data decompression processing in which it decompresses the non-route-surrounding data and records the non-route-surrounding data, which is the decompressed data, into the hard disk of the data recording section 16 (step S96).

The non-route-surrounding data decompression processing is executed giving preference to those areas most likely to be used for a re-search (i.e., areas closest to route and/or current location).

The CPU 31 executes re-search processing, in which it determines whether or not all the non-route-surrounding data is decompressed (step S97), and if all the non-route-surrounding data is decompressed, a current position and non-route-surrounding data are read and then, a route from the current position up to the original search route is re-searched according to the non-route-surrounding data.

Because according to this exemplary embodiment the surrounding data is read immediately without decompression processing after the ignition switch is turned on to start the navigation device 14, a vehicle can be driven immediately using the route guidance data.

Furthermore, according to this exemplary embodiment, the compression processing is carried out by the personal computer 61, according to various other exemplary embodiments, the compression processing may be executed by the information center 62. In this case, in the compression processing in the information center 62, the route guidance data is divided into surrounding data and non-surrounding data, and the non-surrounding data is further divided into route-surrounding data and other non-route-surrounding data. The surrounding data is not compressed while the route-surrounding data and non-route-surrounding data are compressed at the compression rates α2, α3 respectively.

According to the seventh and eighth embodiments, after the compressed data, partially compressed data, and the like transmitted from the information center 62 are downloaded into the hard disk of the personal computer 61, the compressed data, partially compressed data, and the like are transferred to the navigation device 14. However, according to various other exemplary embodiments, the compressed data transmitted from the information center 62 may be received directly by the navigation device 14.

According to the above-described exemplary embodiments, the compressed data, partially compressed data, and the like downloaded into the hard disk of the recording unit 74 are transmitted to the navigation device 14 and recorded in the flash memory 30. According to this exemplary embodiment, the compressed data, partially compressed data, and the like downloaded into the hard disk of the recording unit 74 are recorded into a memory card temporarily and the memory card is set into the data recording section 16 of the navigation device 14 and at the same time, recorded into the hard disk or the like of the data recording section 16.

According to the above exemplary embodiments, the route guidance data is transmitted to the personal computer 61, the navigation device 14, and the like as navigation information. However, if the route search is not executed, the map data can be transmitted to the personal computer 61, the navigation device 14 and the like as the navigation information. In this case, the map data is compressed.

According to the above exemplary embodiments, the compressed data transmitted from the personal computer 61 or from the server 63 is recorded in the flash memory 30 and after that, decompressed and recorded in the hard disk of the data recording section 16 as decompressed data. However, the compressed data transmitted from the personal computer 61 or from the server 63 may be recorded in the hard disk and the decompressed data may be recorded in the flash memory 30. Because as described above, the data recording section 16 allows various kinds of external memory devices such as the memory card to be set as well as the hard disk, the compressed data transmitted from the personal computer 61 or from the server 63 may also be recorded in an external memory device and the decompressed data may be recorded in the flash memory 30.

As described above, the information center 62 is capable of transmitting route guidance data and other types of information, such as traffic information, general information, image information, music information and the like to the personal computer 61. Thus, an operator can transfer other types of information downloaded into the hard disk to the navigation device 14 when a vehicle stays in a garage and record it in, for example, the flash memory 30 in the navigation processing section 17.

If communication required time for transferring the other types of information to the navigation device 14 is long, the navigation device 14 needs to be on. Thus, as described above, electric power consumed by the navigation device 14 increases and consequently the load applied to the battery mounted on a vehicle increases tremendously.

Accordingly, a ninth exemplary embodiment in which other types of information may be transmitted from the information center 62 and compressed to create compressed data and the compressed data is transferred to the navigation device 14 will be described.

Figure 22:
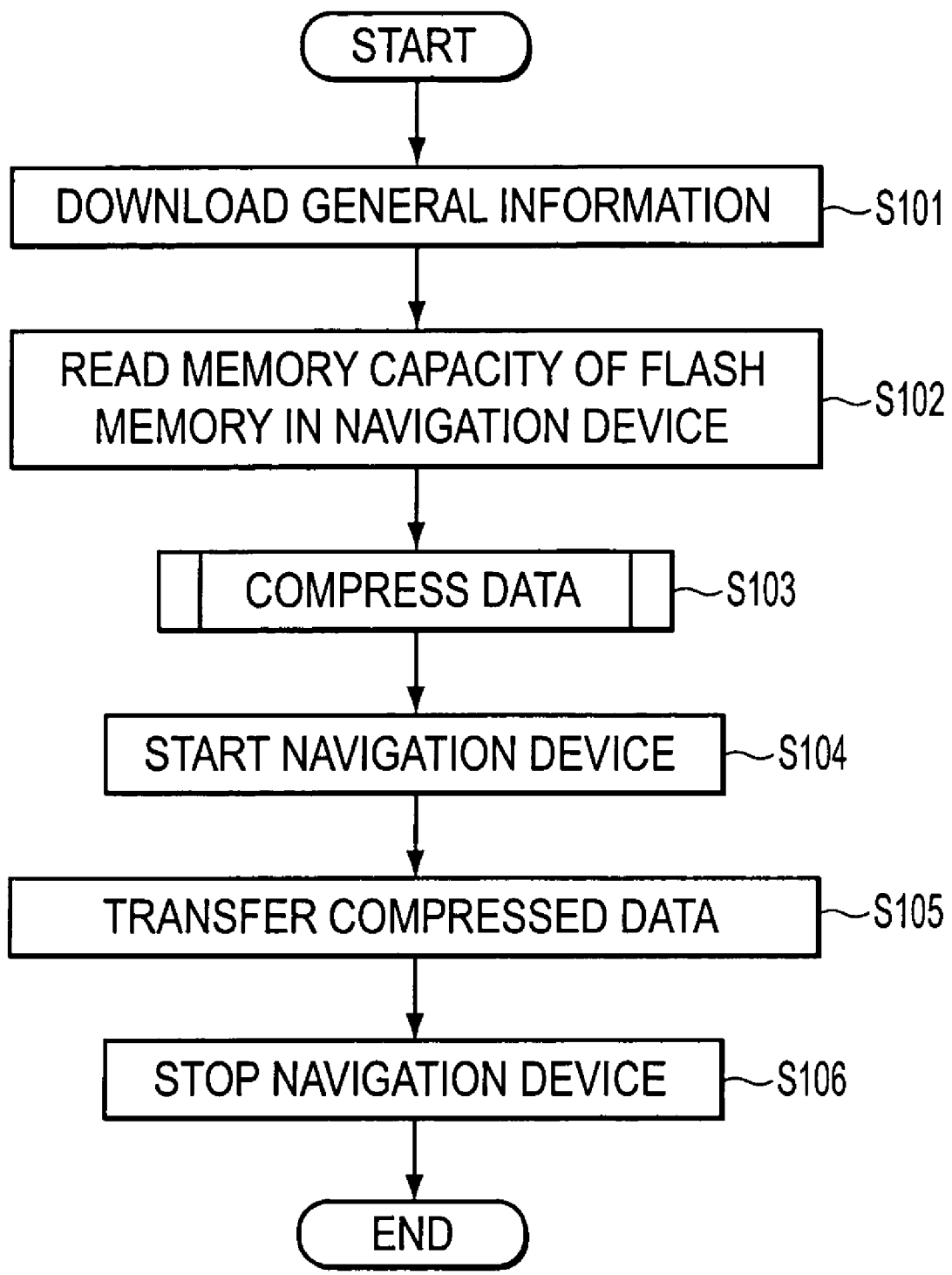
FIG. 22 is a main flow chart showing the operation of a personal computer according to a ninth exemplary embodiment of the invention.
Figure 23:
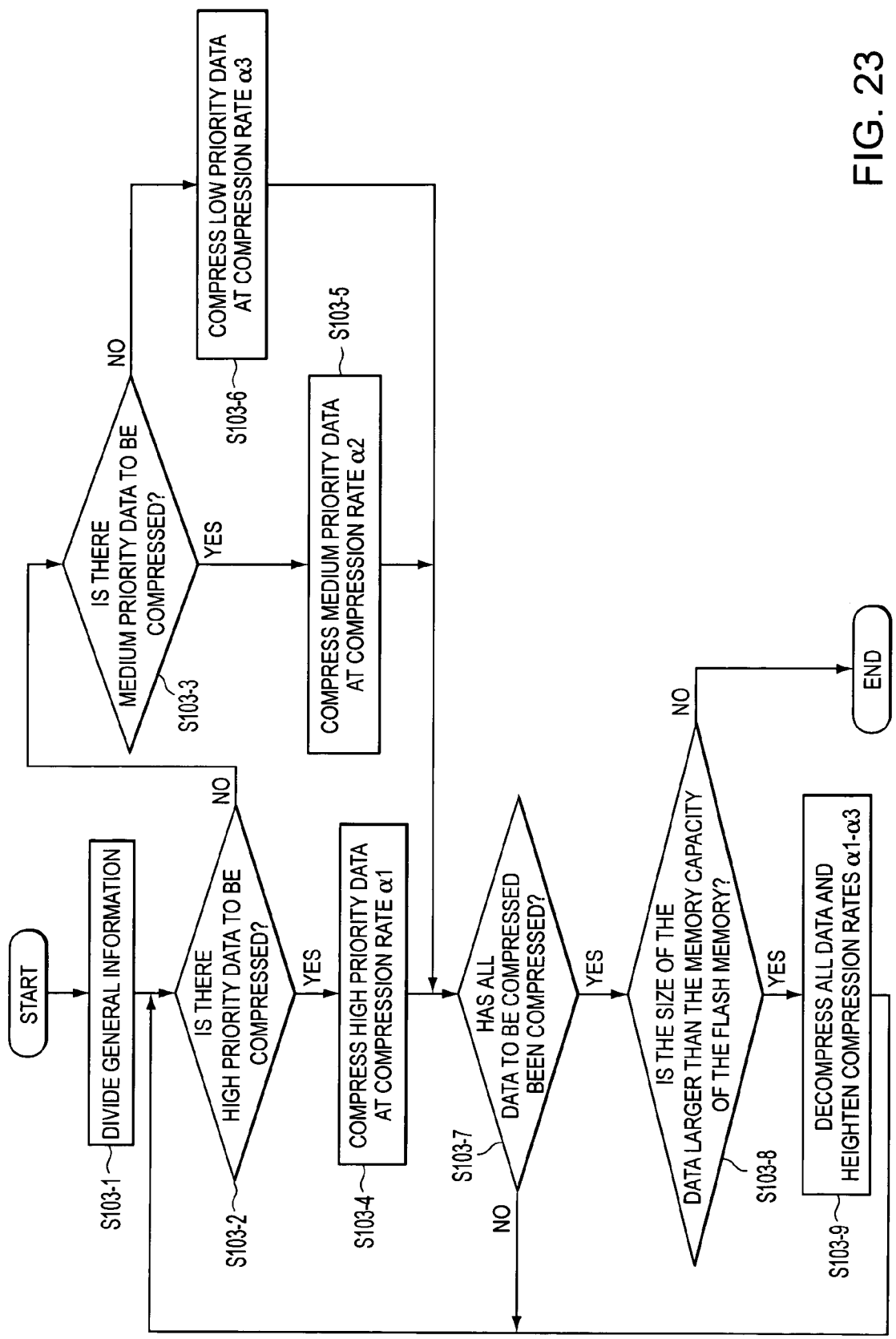
FIG. 23 is a diagram showing the sub-routine of compression processing according to the ninth exemplary embodiment of the invention.
Figure 24:
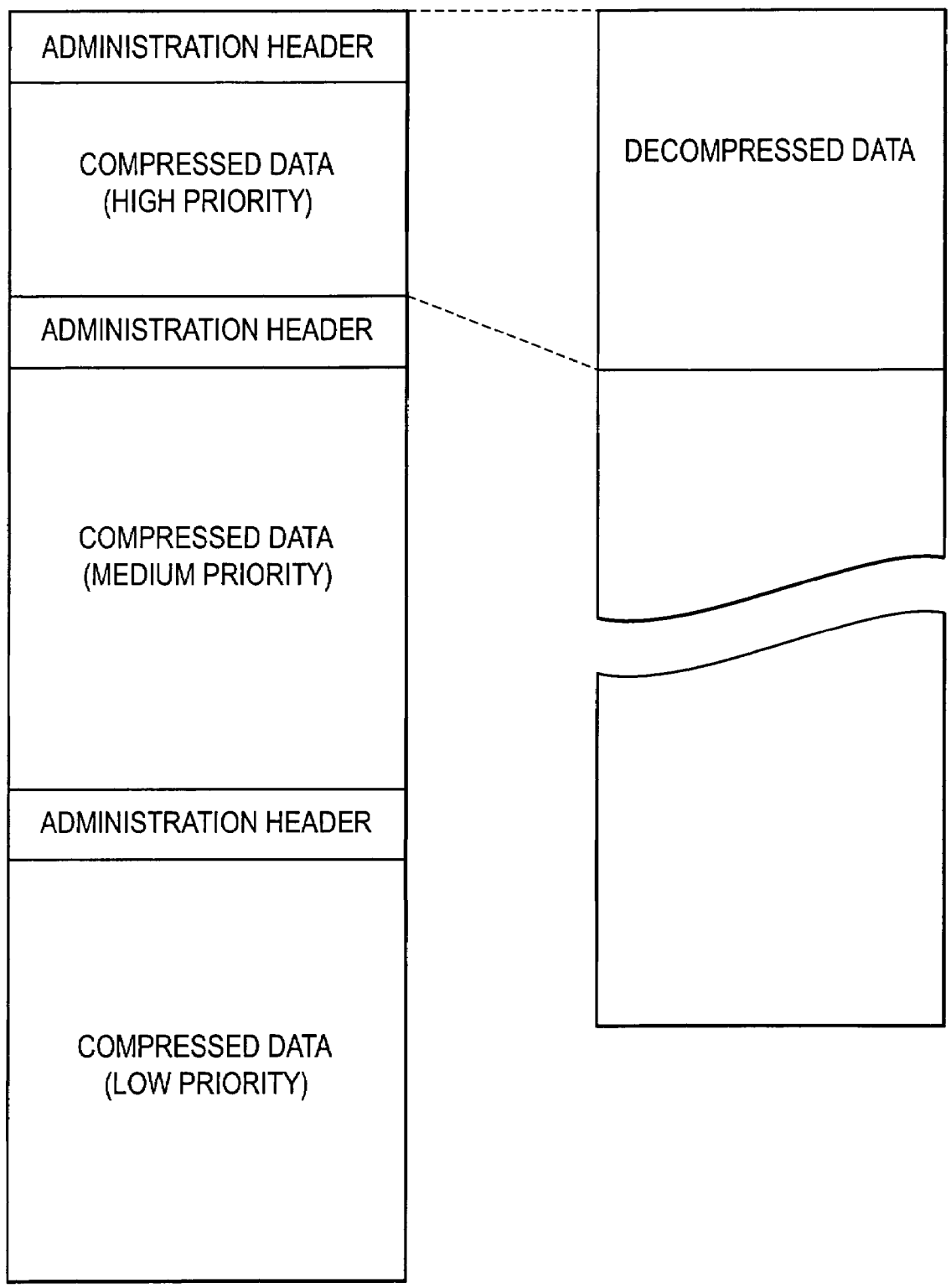
FIG. 24 is a diagram showing the data configuration upon decompression processing according to the ninth exemplary embodiment of the invention.

FIG. 22 is a main flow chart showing the operation of a personal computer according to the ninth exemplary embodiment of the invention. FIG. 23 is a diagram showing the sub-routine of the compression processing according to the ninth exemplary embodiment of the invention. FIG. 24 is a diagram showing the data structure upon decompression processing according to the ninth exemplary embodiment of the invention.

First, if an operator transmits an information request to the information center 62 by operating the operating section 73 of the personal computer 61 (FIG. 1) the server 63 executes information obtainment processing to read general information from a database disposed separately from the navigation database 64 and obtain it.

Subsequently, the server 63 executes information transmission processing to transmit general information obtained by the server 63 to the personal computer 61.

Then, in the personal computer 61, the CPU 71 executes reception processing to receive the general information and the CPU 71 executes recording processing to download the general information into the hard disk of the recording unit 74 (step S101).

After the navigation device 14 starts, the general information is classified depending on whether a user needs it, that is whether it should be provided and/or with what priority. Therefore, when the general information is recorded in the hard disk, the priority order is recorded together.

Next, the CPU 71 reads the memory capacity of the flash memory 30 (FIG. 2) in the navigation device 14 (step S102), and the CPU 71 executes compression processing to compress the downloaded general information based on the memory capacity so as to be recorded in the flash memory 30 (step S103).

Thus, the CPU 71 reads out the general information from the hard disk and divides the general information into data groups according to the priority order (S103-1). The CPU 71 divides the general information into a high priority data group to be decompressed with the highest priority, a medium priority data group to be decompressed with a next highest priority, and a low priority data group to be decompressed with the lowest priority.

Subsequently, the CPU 71 compresses the high priority data, medium priority data and low priority data at the compression rates α1-α3 (steps S103-4, S103-5, and S103-6) to create compressed data supplied with an administration header and records each compressed data into the flash memory of the recording unit 74. In this case, the respective compression rates α1-α3 of the high priority data, medium priority data and low priority data are set to be different from each other. The compression rate α1 of the high priority data is set low because it needs to be decompressed in the navigation device 14 immediately after the ignition switch is turned on. The compression rate α2 of the medium priority data is set to a medium level because it only needs to be decompressed, for example, after a vehicle is started, and the compression rate α3 of the low priority data is set high because it only needs to be decompressed after the decompression of the medium priority data is terminated after the vehicle is started.

The administration header is information for controlling the compressed data and includes, for example, an administration ID, data size indicating the size of the compressed data, and other data. Typically, due to the different compression rates, the data size of the compressed high priority data is large, the compressed medium priority data is medium, and the compressed low priority data is small.

The CPU 71 executes data size determination processing to determine the data size of the high priority data, medium priority data and low priority data, that is total data size in order to determine whether or not the all data size is larger than the memory capacity of the flash memory 30 (step S103-7). If the all data size is larger than the memory capacity of the flash memory 30, the data size determination processing means changes the compression rates α1-α3 to higher values in order to recompress the data (step S103-8).

Although according to this exemplary embodiment, the high priority data is compressed at compression rate α1, according to various other exemplary embodiments, the high priority data may not be compressed.

Although according to this embodiment, when the entire data size is larger than the memory capacity of the flash memory 30, the data size determination processing means changes the compression rates α1-α3 to higher values, in various other exemplary embodiments, only one or two of the compression rates will be heightened if the entire data size is larger than the memory capacity of the flash memory 30.

If the compressed data is created in this way, the CPU 71 executes compressed data transmission processing to transfer the compressed data to the navigation device 14. Thus, if an operator starts the navigation device 14 by operating the operating section 73, the CPU 71 executes navigation device start processing to turn on the power of the navigation device 14 to start the navigation device 14 (step S104). The CPU 71 executes data transferring processing to read out compressed data from the flash memory of the recording unit 74 and transfer it to the navigation device 14 (step S105). Then, in the navigation device 14, the CPU 31 executes compressed data recording processing to record compressed data into the flash memory 30.

If all the compressed data is recorded in the flash memory 30, the CPU 71 executes navigation device stop processing to stop the navigation device 14 (step S106) and the compressed data is available.

Thus, when general information is transmitted from the personal computer 61 to the navigation device 14, the general information is compressed according to priority order. Therefore, the data size of the compressed data can be reduced. Required communication time is also shortened and a time in which the navigation device 14 is powered may be reduced. Thus, power consumed by the navigation device 14 is decreased, and consequently, load applied to a battery mounted on a vehicle can be reduced. Further, because the communication required time is short, an operator's workload can be simplified thereby reducing communication cost.

Although according to the above-described respective embodiments, a personal computer 61 may be used as a user terminal and information obtainment processing, compression processing, compressed data transmission processing and the like are executed by the personal computer 61, it is possible to use a home server provided in a driver's home as a user terminal and execute the information obtainment processing, compression processing, compressed data transmission processing and the like at the home server.

In this case, the home server refers to a server which obtains information from outside, accumulates the obtained information and controls and edits the accumulated information corresponding to a user's request and further is capable of transmitting information to an external device, for example, a personal computer, portable phone, PDA, navigation device and the like.

While various features of this invention have been described in conjunction with the exemplary embodiments outlined above, various alternatives, modifications, variations, and/or improvements of those features may be possible. Accordingly, the exemplary embodiments of the invention, as set forth above, are intended to be illustrative. Various changes may be made without departing from the spirit and scope of the invention.

The invention claimed is:

1. A navigation system for transmitting a plurality of information portions, the information portions including a surrounding information portion and a non-surrounding information portion, the surrounding information portion including navigation data surrounding an area containing a starting point and the non-surrounding information portion including other navigation data, the system comprising:
   a controller that compresses non-surrounding information portion while maintaining the surrounding information portion uncompressed; and
   a transmitter that transmits the compressed non-surrounding information portion and the uncompressed surrounding information portion to a navigation device.

2. The navigation system of claim 1, wherein the controller and the transmitter are included in an information center.

3. The navigation system of claim 1, wherein the controller and the transmitter are included in a user terminal.

4. The navigation system of claim 3, wherein the user terminal is connected to an information center over a network.

5. The navigation system of claim 4, wherein the information center provides the plurality of information portions to the controller in the user terminal.

6. The navigation system of claim 1, wherein the non-surrounding information portion includes a plurality of information sub-portions.

7. The navigation system of claim 6, wherein the non-surrounding information portion includes at least a route-surrounding information sub-portion and a non-route-surrounding information sub-portion.

8. The navigation system of claim 7, wherein the controller compresses the route-surrounding information sub-portion and the non-route-surrounding information sub-portion at respectively different compression rates.

9. The navigation system of claim 8, wherein a compression rate of the non-route-surrounding information sub-portion is higher than a compression rate of the route-surrounding information sub-portion.

10. The navigation system of claim 1, wherein each of the plurality of information portions includes map data.

11. The navigation system of claim 1, wherein at least one of the plurality of information portions includes route guidance data including a searched for route.

12. A navigation device, comprising:
a receiver that receives a plurality of information portions, wherein the plurality of information portions includes a surrounding information portion and a non-surrounding information portion, the surrounding information portion including navigation data surrounding an area containing a starting point and the non-surrounding information portion including other navigation data, and the surrounding information portion and the non-surrounding information portion are each; and
a controller that decompresses the surrounding information portion before the non-surrounding information portion.

13. The navigation device of claim 12, wherein a compression rate of the non-route-surrounding information sub-portion is higher than a compression rate of the route-surrounding information sub-portion.

14. The navigation device of claim 12, wherein the non-surrounding information portion includes a plurality of information sub-portions.

15. The navigation device of claim 12, wherein, when an ignition switch is turned on, the controller first decompresses the surrounding information portion and second decompresses the non-surrounding information portion.

16. The navigation device of claim 12, wherein the controller decompresses the surrounding information portion as soon as it is received by the receiver and decompresses the non-surrounding information portion when an ignition switch of a vehicle is turned on.

17. The navigation device of claim 12, further comprising a present position detector that detects a current position, wherein the controller determines whether each of the plurality of information portions is the surrounding information portion based on position information included within each of the plurality of information portions and the current position.

18. The navigation device of claim 12, further comprising a present position detector that detects a current position, wherein the controller determines whether each of the plurality of information portions is nearby non-surrounding information based on position information included within each of the plurality of information portions and the current position and the controller successively decompresses nearby non-surrounding data as the current position is updated.

19. The navigation device of claim 12, wherein each of the plurality of information portions includes map data.

20. The navigation device of claim 12, wherein at least one of the plurality of information portions includes route guidance data including a searched for route.

21. The navigation device of claim 15, wherein the controller decompresses the non-surrounding information portion after a vehicle starts traveling.

22. The navigation device of claim 14, wherein the non-surrounding information portion includes at least a route-surrounding information sub-portion and a non-route-surrounding information sub-portion.

23. The navigation device of claim 22, wherein, when an ignition switch is turned on, the controller first decompresses the surrounding information portion, second decompresses the route-surrounding information sub-portion, and third decompresses the non-route-surrounding information sub-portion.

24. A method for transmitting a plurality of information portions to a navigation device, the information portions including a surrounding information portion and a non-surrounding information portion, the surrounding information portion including navigation data surrounding an area containing a starting point and the non-surrounding information portion including other navigation data, the method comprising:
compressing the non-surrounding information portion while maintaining the surrounding information portion uncompressed; and
transmitting the compressed non-surrounding information portion and the uncompressed surrounding information portion to the navigation device.

25. A method for receiving information in a navigation device, comprising:
receiving a plurality of information portions, wherein the plurality of information portions includes a surrounding information portion and a non-surrounding information portion, the surrounding information portion including navigation data surrounding an area containing a starting point and the non-surrounding information portion including other navigation data, and the surrounding information portion and the non-surrounding information portion are each compressed priority; and
decompressing the surrounding information portion before the non-surrounding information portion.

26. A navigation system for transmitting a plurality of information portions, the information portions including a surrounding information portion and a non-surrounding information portion, the surrounding information portion including navigation data surrounding an area containing a starting point and the non-surrounding information portion including other navigation data, the system comprising:
a first controller that compresses both the surrounding information portion and the non-surrounding information portion;
a transmitter that transmits the compressed information portions to a navigation device;
a receiver that receives the compressed information portions; and
a second controller that decompresses each of the compressed information portions;
wherein the second controller decompresses the surrounding information portion before the non-surrounding information portion.

27. The navigation system of claim 26, wherein the receiver is in the navigation device.

28. The navigation system of claim 27, wherein the second controller is in a navigation device.

29. The navigation system of claim 26, wherein the first controller and the transmitter are included in an information center.

30. The navigation system of claim 26, wherein the first controller and the transmitter are included in a user terminal.

31. The navigation system of claim 30, wherein the user terminal is connected to an information center over a network.

32. The navigation system of claim 26, wherein each of the plurality of information portions includes map data.

33. The navigation system of claim 26, wherein at least one of the plurality of information portions includes route guidance data including a searched for route.

* * * * *